United States Patent
Kumar Agrawal et al.

(10) Patent No.: US 12,033,598 B1
(45) Date of Patent: Jul. 9, 2024

(54) ELECTRONIC DEVICES AND CORRESPONDING METHODS FOR IDENTIFYING A CONTENT PRESENTATION COMPANION DEVICE PORT

(71) Applicant: Motorola Mobility LLC, Chicago, IL (US)

(72) Inventors: Amit Kumar Agrawal, Bangalore (IN); Gautham Natakala Prabhakar, Bangalore (IN); Yuliang Wang, Xiamen (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/113,986

(22) Filed: Feb. 24, 2023

(30) Foreign Application Priority Data

Dec. 22, 2022 (CN) .......................... 202211655146.0

(51) Int. Cl.
  *G09G 5/00* (2006.01)
  *G06F 3/14* (2006.01)
  *G06F 3/16* (2006.01)

(52) U.S. Cl.
  CPC ........... *G09G 5/003* (2013.01); *G06F 3/1423* (2013.01); *G06F 3/167* (2013.01); *G09G 2370/047* (2013.01); *G09G 2370/12* (2013.01)

(58) Field of Classification Search
  CPC .............. G09G 5/003; G09G 2370/12; G09G 2370/04–047; G06F 3/1423; G06F 3/167
  See application file for complete search history.

(56) References Cited

U.S. PATENT DOCUMENTS

| | | | |
|---|---|---|---|
| 7,839,409 B2 | 11/2010 | Noorbakhsh et al. | |
| 7,911,473 B2 | 3/2011 | Noorbakhsh et al. | |
| 8,069,276 B2 | 11/2011 | Kang et al. | |
| 8,531,352 B2 | 9/2013 | Zeng et al. | |
| 9,001,133 B2 | 4/2015 | Kim et al. | |
| 9,258,602 B2 | 2/2016 | Kabuto et al. | |
| 9,501,157 B2 | 11/2016 | Soffer | |
| 9,942,508 B2 | 4/2018 | Kim et al. | |
| 10,490,099 B2 | 11/2019 | Zavesky et al. | |
| 2006/0095848 A1* | 5/2006 | Naik ...................... | G11B 27/34 715/810 |

(Continued)

OTHER PUBLICATIONS

"DataPro DisplayPort Guide and FAQ", DataPro International; Unknown exact publication date but believed to be prior to filing of present application; Available online at https://www.datapro.net/techinfo/displayport_info.html.

(Continued)

*Primary Examiner* — Stephen G Sherman
(74) *Attorney, Agent, or Firm* — Philip H. Burrus, IV

(57) ABSTRACT

An electronic device includes a communication device and a user interface. The communication device detects establishment of an electrical communication channel to a content presentation companion device. One or more processors operable with the communication device and the user interface cause the communication device to query the content presentation companion device for a content presentation companion device port facilitating the electrical communication channel and, in response, cause the user interface to identify the content presentation companion device port.

20 Claims, 12 Drawing Sheets

(56) References Cited

U.S. PATENT DOCUMENTS

| | | | |
|---|---|---|---|
| 2007/0186015 A1 | 8/2007 | Taft et al. | |
| 2011/0317071 A1* | 12/2011 | McRae | H04N 21/472 |
| | | | 348/558 |
| 2013/0080662 A1* | 3/2013 | Bourque | H04N 21/4367 |
| | | | 710/10 |
| 2013/0223632 A1 | 8/2013 | Kim et al. | |
| 2015/0134860 A1* | 5/2015 | Lee | H04N 21/43635 |
| | | | 710/9 |

OTHER PUBLICATIONS

"Hot Plug Detection, DDC, and EDID", DataPro International Inc; Unknown exact publication date but believed to be prior to filing of present application; available online at https://www.datapro.net/techinfo/hot_plug_detection.html.

"Samsung—TV Switches Source by Itself", Description of Help available online at https://www.samsung.com/us/support/troubleshooting/TSG01111222/ ; Unknown exact publication date but believed to be prior to filing of present application.

"Stack Over Flow Questions", Detect/Identify Port Monitor on Windows; Answer Published online Jan. 24, 2020; available at https://stackoverflow.com/questions/31712915/detect-identify-the-port-hdmi-other-the-monitor-is-connected-to-in-windows-7,.

"Understanding EDID—Extended Display Identification Data", Article by Digital Connection; Published Fall 2009; ExtroNews 20.3.

"Understanding EDID—Extended Display Identification Data", Extron Article Published 2022; Available online at https://www.extron.com/article/uedid.

"VESA Enhanced Extended Display Identification Data Standard", Published Sep. 25, 2006; Release A, Revision 2; EDID Standard; pp. 1-91.

* cited by examiner

| ADDRESS | DATA | GENERAL DESCRIPTION |
|---|---|---|
| 0-7 | Header | Constant Fixed Pattern |
| 8-9<br>10-11<br>12-14<br>16-17 | Manufacturer ID<br>Product ID Code<br>Serial Number<br>Manufacture Date | Display Product Identification |
| 18<br>19 | EDID Version No.<br>EDID Revision No. | EDID Version Information |
| 20<br>21<br>22<br>23<br>24 | Video Input Type<br>Horizontal Size (cm)<br>Vertical Size (cm)<br>Display Gamma<br>Supported Features | Basic display parameters. Video input type, display size, power management, sync, color space, timing capabilities and preferences. |
| 25-34 | Color Characteristicis | Color space Definition |
| 35-36<br>37<br>38-53<br>54-71<br>72-89<br>90-107<br>108-125 | Established Supported Timings<br>Manufacturer's Reserved Timing<br>EDOD Standard Timings Supported<br>Detailed Timing Descriptior Block 1<br>Detailed Timing Descriptor Block 2<br>Detailed Timing Descriptor Block 3<br>Detailed Timing Descriptor Block 4 | Timing information for all resolutions supported by the display. |
| 126 | Extension Flag | Number of optional extension blocks |
| 127 | Checksum | |

FIG. 9
*-- PRIOR ART --*

| ADDRESS | GENERAL DESCRIPTION |
|---|---|
| 0 | Always "N," where N is the new extension |
| 1 | Revision number |
| 2 | Pointer to timing descriptors |
| 3 | Number of timing descriptors |
| 4 to d-1 | Data block description indicating to which output each cable and device are connected; And to which cable the device is tuned |
| d to d+17 | First 18-byte detailed timing descriptor |
| ⋮ | ⋮ |
| d+18(n-1) to d+18n-1 | Final 18-byte detailed timing descriptor |
| d+18n to 126 | "0" Padding |
| 127 | Checksum |

*FIG. 10*

ELECTRONIC DEVICES AND CORRESPONDING METHODS FOR IDENTIFYING A CONTENT PRESENTATION COMPANION DEVICE PORT

BACKGROUND

Technical Field

This disclosure relates generally to electronic devices having communication circuits, and more particularly to electronic devices engaged in the transmission of signals supplied in digital form, including data transmission and telegraphic communication, with a content presentation companion device.

Background Art

The advanced processing power available in modern electronic communication devices, examples of which include smartphones, tablet computers, and laptop computers, enable voice and video communications between people. Additionally, such devices can also engage in videoconferences, stream content such as movies, videos, and television shows, play music, and offer other forms of entertainment. In addition to being tools for communicating with friends, family, and work colleagues, these devices are also real-time multimedia content entertainment devices.

Some electronic devices are equipped with a content redirection feature that allows this multimedia content to stream through a first device, such as a smartphone, and then to be redirected to a second device having a larger display. While this makes events such as movies, television shows, and videoconferences easier to see, it also allows a content presentation companion device having a larger display serve as the primary display for the electronic device itself. While a neat feature, properly connecting the electronic device to a content presentation companion device can be challenging. It would be advantageous to have electronic devices and systems that make this process simpler.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 9 illustrates a prior art extended display identification data (EDID) file structure.

FIG. 10 illustrates one explanatory EDID extension block of data in accordance with one or more embodiments of the disclosure.

Figure 1:
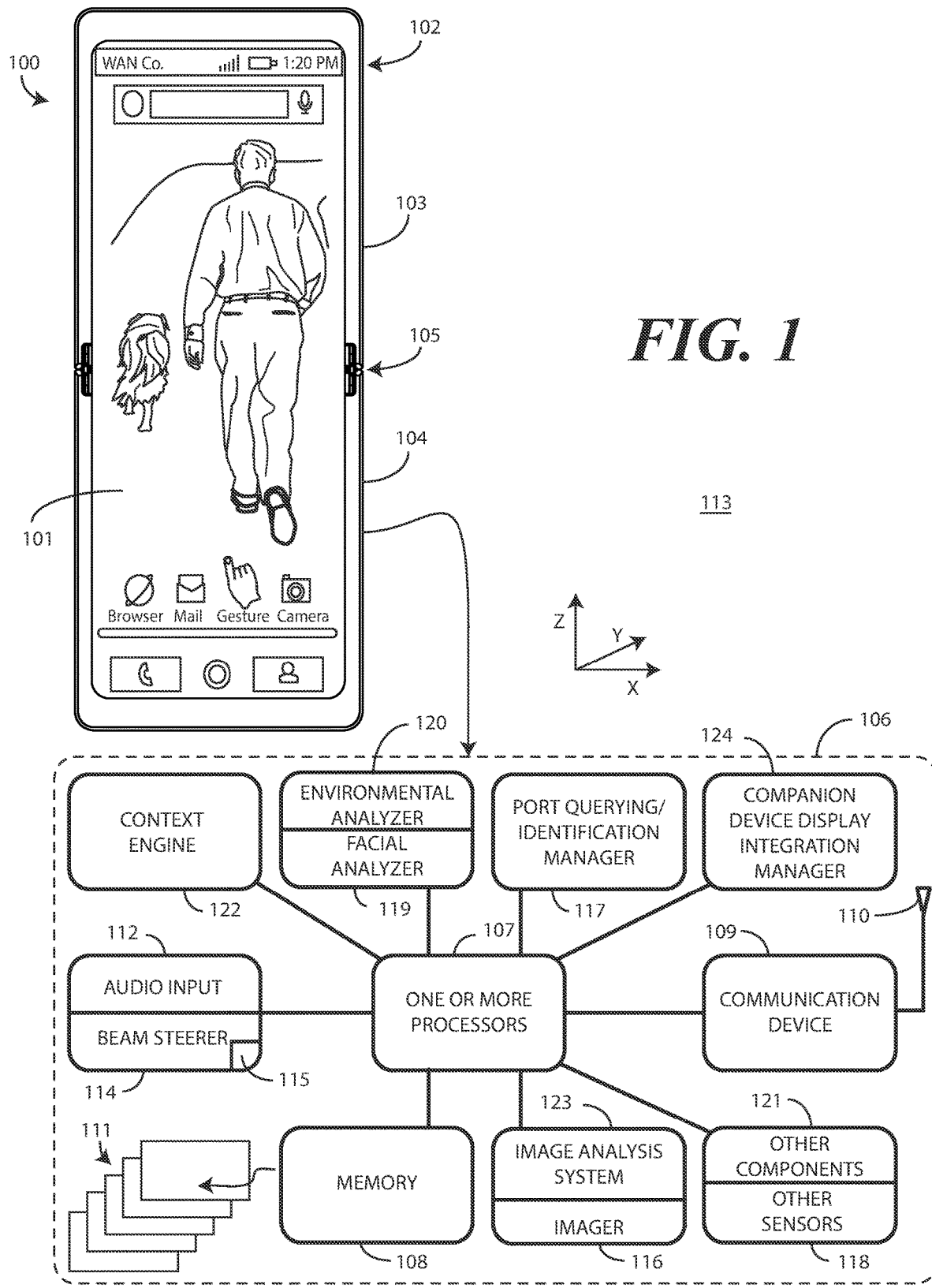
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to query a content presentation companion device for a content presentation companion device port facilitating an electrical communication channel between a communication device of an electronic device and the content presentation companion device and identifying that content presentation companion device port on a user interface of the electronic device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of querying a content presentation companion device for an identification of an input source between an electronic device and the content presentation companion device and presenting the identification of the input source on a user interface of the electronic device as described herein. The non-processor circuits may include, but are not limited to, a radio receiver, a radio transmitter, signal drivers, clock circuits, power source circuits, and user input devices.

As such, these functions may be interpreted as steps of a method to perform identifying an input source of a content presentation companion device with which a communication device of an electronic device is electrically communicating on a user interface of an electronic device in response to querying the content presentation companion device to determine the identity of the input source. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, some modern portable electronic devices are equipped with a content redirection feature. Using smartphones manufactured by Motorola Mobility™ as one illustrative example, some models are equipped with their Ready For™, which is a feature that allows the Ready For™ device to connect to a content presentation companion device such as a larger monitor, television, or other device having a larger screen. Using the Ready For™ feature, users can wirelessly stream video content to the larger display of a content presentation companion device with no loss in performance. Illustrating by example, resolution of the images on the content presentation companion device is up to 4K with a frame rate that presents content without flicker or distortion.

While the Ready For™ feature does not require a cable or a docking station, many electronic devices do require a physical connection between the electronic device and the content presentation companion device for a content redirection feature to work properly. Indeed, many standards such as the highly popular and ubiquitous high-definition multimedia interface (HDMI) interface standard require a physical wire be connected between a source device and a display device for content redirection to work. Additionally, even some users of advanced content redirection technologies such as Ready For™ even prefer to use a docking station and/or physical cable to couple their electronic device to a content presentation companion device due to the fact that a physical cable invariably offers a more reliable and faster data connection than do most wireless connections.

Figure 12:
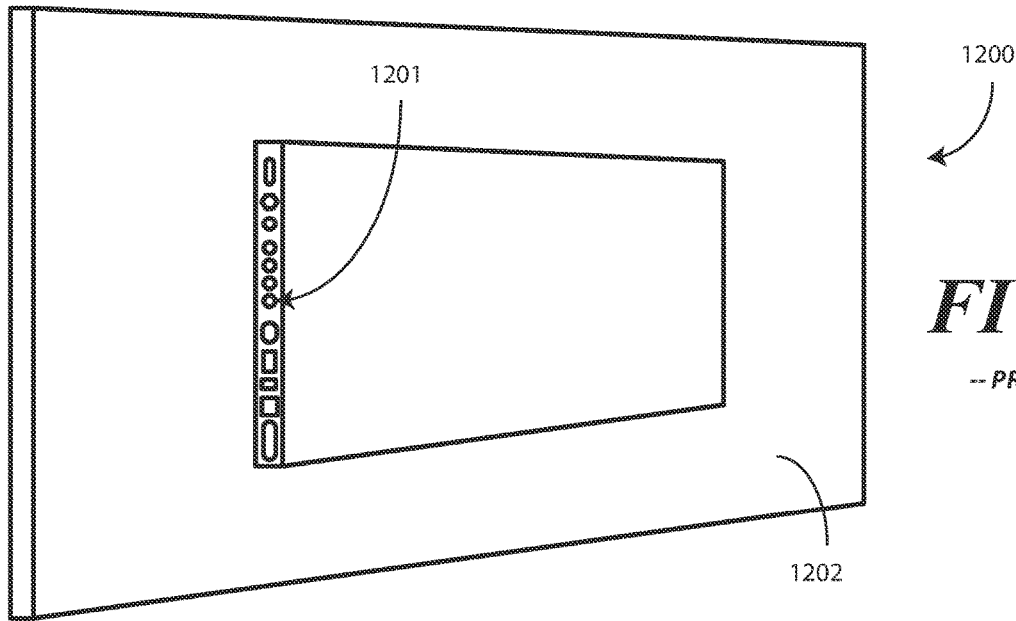
FIG. 12 illustrates the rear side of a prior art content presentation companion device.

Sometimes, however, connecting a physical cable to a content presentation companion device can be a complete nightmare. To illustrate, turning now to FIG. 12, illustrated therein is the rear side of a prior art content presentation companion device 1200. This content presentation companion device 1200 is configured as a television monitor, but could be a computer monitor, simple external display monitor, or other content presentation companion device having one or more inputs 1201 and a large display. As shown, these inputs 1201 are many, are located on the rear side of the content presentation companion device and are clustered together along a thin strip of the device housing 1202 of the content presentation companion device 1200. While offering many different connection modes, e.g., HDMI, coaxial cable, ¼-inch, RCA, optical, universal serial bus (USB), and others, the inputs 1201 are all closely packed together. Complicating matters, the content presentation companion device 1200 may include two, three, or four of the same type of inputs such that four different HDMI connections and three different USB connections, for example, can be made to the content presentation companion device 1200.

When a person has four such connections to the content presentation companion device 1200, after connecting a source device to one of these connections they frequently have to then "tune" the content presentation companion device 1200 to the proper input. They may, for example, be required to use a remote control or other controls on the content presentation companion device 1200 to cause the processors of the content presentation companion device 1200 to choose "HDMI3" as the input rather than "HDMI2," and so forth.

Figure 13:
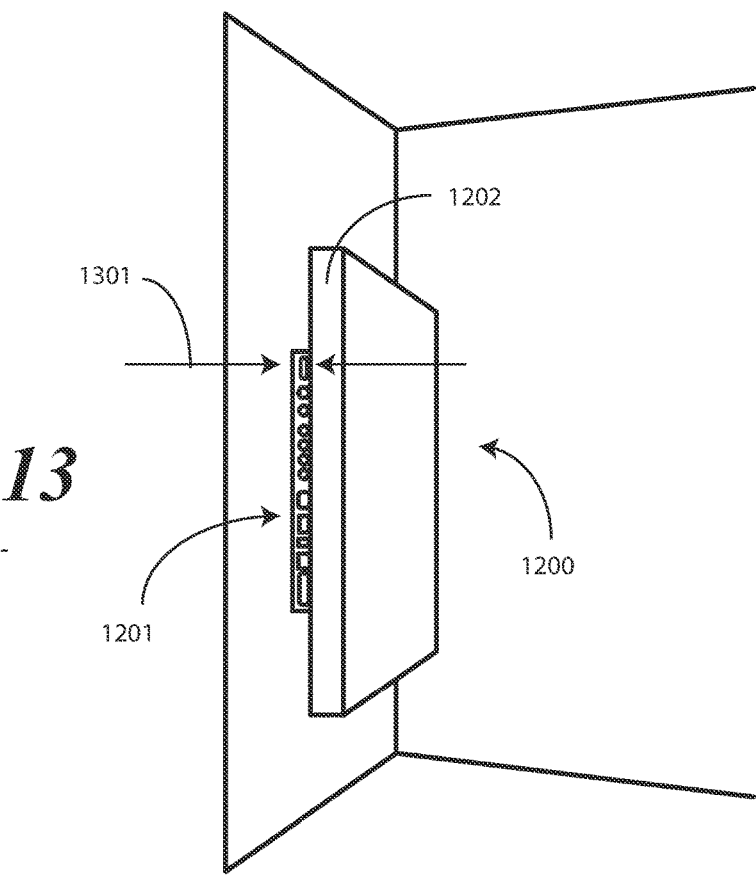
FIG. 13 illustrates a common usage setting for a prior art content presentation companion device.

Turning now to FIG. 13, this figure illustrates just one of the problems that can arise when trying to connect a source device to a content presentation companion device. In this figure, the content presentation companion device 1200 of FIG. 12 is hanging on a wall. Due to the small width 1301 of the thin strip of the device housing 1202 of the content presentation companion device 1200 supporting the one or more inputs 1201, it is incredibly difficult to reach a hand and cable between the content presentation companion device 1200 and the wall to make the proper connection.

Even when this can be done, it is frequently almost impossible to visually see which input is which. Monikers identifying the inputs 1201 are generally molded into the thin strip of the device housing 1202 of the content presentation companion device 1200 and are therefore the same color as the device housing 1202 itself. Even with a flashlight it can be nearly impossible to tell, for example, whether your smartphone is connected to "HDMI1," "HDMI2," "HDMI3," "HDMI4" and so forth.

Even if one knows to which connector their device is connected, they still likely have to find a remote or other device to tune the content presentation companion device 1200 to that input. This is problematic because different content presentation companion devices frequently name their inputs differently. Illustrating by example, while one content presentation companion device may call the four HDMI inputs "HDMI1," "HDMI2," and so forth, another might label these inputs "Digital1," "Digital2," and so forth. Consequently, to find the input source to which the smartphone is connected a user may need to try several different options with the remote control before finally selecting the proper input.

Embodiments of the present disclosure provide solutions to these problems. In one or more embodiments, one or more processors of an electronic device determine that the electronic device is connected to a content presentation companion device via a wire or other physical electrical communication connection. For instance, the one or more processors of the electronic device may determine that the USB-C port of a smartphone is connected by a physical wire to an HDMI port of an external monitor.

In one or more embodiments, using the HDMI communication protocol, the one or more processors of the electronic device query the content presentation companion device for the connected port information. Said differently, the one or more processors of the electronic device query the content presentation companion device to find out to which input source port of the content presentation companion device the cable is connected. In one or more embodiments, the content presentation companion device utilizes the "hot plug detection" feature offered by connection protocols such as HDMI, DisplayPort™, or digital video interface (DVI) port standards and protocols.

In one or more embodiments, the content presentation companion device then transmits, using a modified EDID communication, an EDID extension identifying the port to which the electronic device is connected. Specifically, in one or more embodiments the content presentation companion device transmits an EDID file structure in which the EDID extension flag is set. In one or more embodiments, this extension flag indicates that an additional 128-byte block of data describing increased capabilities of the EDID standard in accordance with embodiments of the disclosure, known as an "extension," will be included with an identification of the port to which the electronic device is connected.

In one or more embodiments, when this EDID extension is received, the one or more processors of the electronic device read the identity of the port or input source and present a prompt on the display of the electronic device that identifies the port or input source. This presentation of the port's or input source's identity on the display allows the user to easily access and utilize this information to select the proper source on the content presentation companion device without having to look at the actual physical connection port to which the cable is physically connected. The presentation of this port or input source identity for each of the electronic devices connected to the content presentation companion device in demonstration and exhibition scenarios where multiple devices with different features and capabilities are connected to a content presentation companion device, as this information will allow a user to quickly switch the input source based upon which electronic device they wish to be a source device.

In one or more embodiments, an electronic device comprises a communication device. In one or more embodiments, the communication device detects establishment of an electrical communication channel to a content presentation companion device.

In one or more embodiments, the electronic device comprises a user interface and one or more processors operable with the user interface and the communication device. In one or more embodiments, the one or more processors cause the communication device to query the content presentation companion device for a content presentation companion device port facilitating the electrical communication channel and, in response, cause the user interface to identify the content presentation companion device port. In one or more embodiments, this comprises presenting the identity of the content presentation companion device port on the display of the electronic device.

In other embodiments, the identification of the content presentation companion device port can be audible rather than visual as a presentation on the display of the electronic device. Illustrating by example, in one or more embodiments the electronic device comprises an audio user interface. In one or more embodiments, the one or more processors can cause the user interface to identify the content presentation companion device port by delivering an audible announcement comprising an identifier of the content presentation companion device port.

In one or more embodiments, the electrical communication channel between the electronic device and the content presentation companion device comprises a wired electrical communication channel, one example of which is by an HDMI cable. In such cases, the one or more processors can cause the communication device to query the content presentation companion device for the content presentation companion device port facilitating the wired electrical communication channel with a hot plug detect feature of the HDMI protocol.

In some embodiments, the presentation of the identity of the input source or content presentation companion device port can be conditional and may only be presented only when the content presentation companion device is not tuned to the proper input source. In one or more embodiments, using the microphone, camera, and/or other sensors of the electronic device, the one or more processors of the electronic device can even determine whether the content presentation companion device is tuned to the source to which the electronic device is connected. For instance, if a smartphone is connected to a television using the second HDMI port, the microphone, camera, and/or other sensors can determine if the input source to which the television is tuned is indeed HDMI2.

In one or more embodiments, the one or more processors can cause the content presentation companion device to present a test image and for the audio output devices of the content presentation companion device to emit a test sound. The imager of the electronic device can capture an image of the content presentation companion device to determine if the test image is being presented. Similarly, the microphone of the electronic device can capture acoustic signals emitted by the content presentation companion device to determine if the test sound is being played.

In situations where the input source of the content presentation companion device is not set or configured to the source with which the electronic device is connected, the one or more processors can present a prompt on the display identifying the content presentation companion device port to the user so that the user can tune to exactly the right input source. If, for example, a smartphone is connected to HDMI2 of a content presentation companion device and the tuner of the content presentation companion device is tunes to an antenna, the smartphone may present a prompt saying, "I'm connected to HDMI2—please tune the television to that input source." If the content presentation companion device is already tuned to HDMI2, in one or more embodiments the one or more processors of the electronic device omit the presentation of any prompt because the content presentation companion device is properly tuned and connected.

Accordingly, in one or more embodiments the electronic device comprises one or more sensors. The one or more sensors can determine, using image processing, audio processing, or combinations thereof, whether the content presentation companion device is tuned to the source corresponding to the content presentation companion device port to which the electronic device is connected. In one or more embodiments, when the one or more sensors fail to detect that the content presentation companion device is tuned to the source corresponding to the content presentation companion device port to which the electronic device is connected, the one or more processors further present a prompt on the display indicating that the content presentation companion device is tuned to a communication channel other than the electrical communication channel coupling the electronic device to the content presentation companion device. In one or more embodiments, the one or more processors can additionally present a prompt instructing the content presentation companion device be tuned to the electrical communication channel.

In one or more embodiments, a method in an electronic device comprises establishing, with a communication device, an electrical communication channel with an input source of a content presentation companion device having a plurality of input sources. In one or more embodiments, the method comprises querying, with the communication device, the content presentation companion device for an identification of the input source. In one or more embodiments, the method comprises presenting, by one or more processors on a user interface, the identification of the input source.

Advantageously, embodiments of the disclosure determine the input port and/or source to which an electronic device is connected to a content presentation companion device with a wire. In one or more embodiments, the electronic device then presents on a display (or via audio) an identification of the input port and/or source. One or more sensors can even determine if the content presentation companion device is tuned to the input port and/or source. Other advantages will be described below. Others will be obvious to those of ordinary skill in the art having the benefit of this disclosure.

Turning now to FIG. 1, illustrated therein is one explanatory electronic device 100 in accordance with one or more embodiments of the disclosure. The electronic device 100 of FIG. 1 is a portable electronic device and is shown as a smartphone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 101, which may optionally be touch-sensitive. Users can deliver user input to the display 101, which serves as a user interface for the electronic device 100. In one embodiment, users can deliver user input to the display 101 of such an embodiment by delivering touch input from a finger, stylus, or other objects disposed proximately with the display 101. In one embodiment, the display 101 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 also includes a device housing 102. In one embodiment, the device housing 102 includes two housing members, namely, a first device housing 103 that is coupled to a second device housing 104 by a hinge 105 such that the first device housing 103 is pivotable about the hinge 105 relative to the second device housing 104 between a closed position and an axially displaced open position.

In other embodiments, the device housing 102 will be rigid and will include no hinge. In still other embodiments, the device housing 102 will be manufactured from a flexible material such that it can be bent and deformed. Where the device housing 102 is manufactured from a flexible material or where the device housing 102 includes a hinge 105, the display 101 can be manufactured on a flexible substrate such that it bends. In one or more embodiments, the display 101 is configured as a flexible display that is coupled to the first device housing 103 and the second device housing 104, spanning the hinge 105. Features can be incorporated into the device housing 102, including control devices, connectors, and so forth.

Also shown in FIG. 1 is an explanatory block diagram schematic 106 of the explanatory electronic device 100. In one or more embodiments, the block diagram schematic 106 is configured as a printed circuit board assembly disposed within the device housing 102 of the electronic device 100. Various components can be electrically coupled together by electrical conductors, or a bus disposed along one or more printed circuit boards.

The illustrative block diagram schematic 106 of FIG. 1 includes many different components. Embodiments of the disclosure contemplate that the number and arrangement of such components can change depending on the particular use case or application. Examples of such applications relevant to the methods described below include content consumption applications, examples of which include video streaming applications, movie streaming applications, image viewing applications, and television show streaming applications, and user interaction applications, examples of which include video games, productivity applications such as word processors and spreadsheets, and content creation applications. Accordingly, electronic devices configured in accordance with embodiments of the disclosure can include some components that are not shown in FIG. 1, and other components that are shown may not be needed and can therefore be omitted.

In one embodiment, the electronic device 100 includes one or more processors 107. In one embodiment, the one or more processors 107 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 106. Each of the application processor and the auxiliary processor(s) can be configured to process and execute executable software code to perform the various functions of the electronic device with which the block diagram schematic 106 operates. A storage device, such as memory 108, can optionally store the executable software code used by the one or more processors 107 during operation.

In this illustrative embodiment, the block diagram schematic 106 also includes a communication device 109 that can be configured for wired or wireless communication with one or more other devices or networks. The networks can include a wide area network, a local area network, and/or personal area network. The communication device 109 may also utilize wireless technology for communication, such as, but are not limited to, peer-to-peer or ad hoc communications such as HomeRF, Bluetooth and IEEE 802.11, and other forms of wireless communication such as infrared technology. The communication device 109 can include wireless communication circuitry, one of a receiver, a transmitter, or transceiver, and one or more antennas 110.

In one embodiment, the one or more processors 107 can be responsible for performing the primary functions of the electronic device with which the block diagram schematic 106 is operational. For example, in one embodiment the one or more processors 107 comprise one or more circuits operable with the display 101 to present presentation information to a user. The executable software code used by the one or more processors 107 can be configured as one or more modules 111 that are operable with the one or more processors 107. Such modules 111 can store instructions, control algorithms, and so forth.

In one or more embodiments, the block diagram schematic 106 includes an audio input/processor 112. The audio input/processor 112 is operable to receive audio input from an environment 113 about the electronic device 100. The audio input/processor 112 can include hardware, executable code, and speech monitor executable code in one embodiment. The audio input/processor 112 can be operable with one or more predefined identification references stored in memory 108.

With reference to audio input, the predefined identification references can comprise representations of basic speech models, representations of trained speech models, or other representations of predefined audio sequences that are used by the audio input/processor 112 to receive and identify voice commands that are received with audio input captured by an audio capture device. In one embodiment, the audio input/processor 112 can include a voice recognition engine. Regardless of the specific implementation utilized in the various embodiments, the audio input/processor 112 can access various speech models stored with the predefined identification references to identify speech commands, languages being spoken, and other information.

The audio input/processor 112 can include a beam steering engine 114 comprising one or more microphones 115. Input from the one or more microphones 115 can be processed in the beam steering engine 114 such that the one or more microphones 115 define a virtual microphone. This virtual microphone can define an acoustic reception cone that can be virtually "steered" around the electronic device 100. Alternatively, actual steering can occur as well, such as switching between a left and right microphone or a front and back microphone or switching various microphones ON and OFF individually. In one or more embodiments, two or more microphones 115 can be included for selective beam steering by the beam steering engine 114.

Illustrating by example, a first microphone can be located on a first side of the electronic device 100 for receiving audio input from a first direction, while a second microphone can be placed on a second side of the electronic device 100 for receiving audio input from a second direction. These microphones can be "steered" by selectively turning them ON and OFF.

The beam steering engine 114 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an image capture device 116 can estimate a location of a person's face and deliver signals to the beam steering engine 114 alerting it in which direction to focus the acoustic reception cone and/or steer the first microphone and the second microphone, thereby adding confirmation to audio steering and saving time. Where multiple people are around the electronic device 100, this steering advantageously directs a beam reception cone toward a particular person so that languages spoken, language preferences, and other information about the person's speech can be ascertained.

Alternatively, the beam steering engine 114 processes and combines the signals from two or more microphones to perform beam steering. The one or more microphones 115 can be used for voice commands and/or for language recognition. In response to control of the one or more microphones 115 by the beam steering engine 114, a user location direction can be determined. The beam steering engine 114 can then select between the first microphone and the second microphone to beam steer audio reception toward the user. Alternatively, the audio input/processor 112 can employ a weighted combination of the microphones to beam steer audio reception toward the user.

The one or more processors 107 can perform filtering operations on audio input received by the audio input/processor 112. For example, in one embodiment the one or more processors 107 can filter the audio input into identifiable audio input, i.e., first audio input, and other audio input that is not identifiable, i.e., second audio input.

Various sensors 118 can be operable with the one or more processors 107. One example of a sensor that can be included with the various sensors 118 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 107, to detect an object in close proximity with—or touching—the surface of the display 101 or the device housing 102 of the electronic device 100 by establishing electric field lines between pairs of capacitive sensors and then detecting perturbations of those field lines.

Another example of a sensor that can be included with the various sensors 118 is a geo-locator that serves as a location detector. In one embodiment, location detector is able to determine location data when authenticating a user. Location can be determined by capturing the location data from a constellation of one or more earth orbiting satellites, or from a network of terrestrial base stations to determine an approximate location. The location detector may also be able to determine location by locating or triangulating terrestrial base stations of a traditional cellular network, or from other local area networks, such as Wi-Fi networks.

Another example of a sensor that can be included with the various sensors 118 is an orientation detector operable to determine an orientation and/or movement of the electronic device 100 in three-dimensional space. Illustrating by example, the orientation detector can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

In one or more embodiments, the electronic device 100 includes an image capture device 116. In one embodiment, the image capture device 116 comprises a two-dimensional imager configured to receive at least one image of a person within an environment of the electronic device 100. In one embodiment, the image capture device 116 comprises a two-dimensional red-green-blue (RGB) imager. In another embodiment, the image capture device 116 comprises an infrared imager. Other types of imagers suitable for use as the image capture device 116 will be obvious to those of ordinary skill in the art having the benefit of this disclosure.

The electronic device 100 can include a face analyzer 119 and an environmental analyzer 120. The face analyzer 119 and/or environmental analyzer 120 can be configured to process an image or depth scan of an object and determine whether the object matches predetermined criteria by comparing the image or depth scan to one or more predefined identification references stored in memory 108.

For example, the face analyzer 119 and/or environmental analyzer 120 can operate as an identification module configured with optical and/or spatial recognition to identify objects using image recognition, character recognition, visual recognition, facial recognition, color recognition, shape recognition, and the like. Advantageously, the face analyzer 119 and/or environmental analyzer 120 can be used as a facial recognition device to determine the identity of one or more persons detected within the environment 113 of the electronic device 100.

The face analyzer 119 can include an image/gaze detection-processing engine as well. The image/gaze detection-processing engine can process information to detect a user's gaze point. Electronic signals can then be delivered from the image capture device 116 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 121 operable with the one or more processors 107 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 121 can also include proximity sensors. The proximity sensors fall in to one of two camps: active proximity sensors and "passive" proximity sensors. Either the proximity detector components or the proximity sensor components can be generally used for gesture control and other user interface protocols.

The other components 121 can optionally include a barometer operable to sense changes in air pressure due to elevation changes or differing pressures of the electronic device 100. The other components 121 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device.

A context engine 122 can then be operable with the various sensors to detect, infer, capture, and otherwise determine persons and actions that are occurring in an environment about the electronic device 100. For example, where included one embodiment of the context engine 122 determines assessed contexts and frameworks using adjustable algorithms of context assessment employing information, data, and events. These assessments may be learned through repetitive data analysis. Alternatively, a user may employ a menu or user controls via the display 101 to enter various parameters, constructs, rules, and/or paradigms that instruct or otherwise guide the context engine 122 in detecting multi-modal social cues, emotional states, moods, and other contextual information. The context engine 122 can comprise an artificial neural network or other similar technology in one or more embodiments.

In one or more embodiments, the context engine 122 is operable with the one or more processors 107. In some embodiments, the one or more processors 107 can control the context engine 122. In other embodiments, the context engine 122 can operate independently, delivering information gleaned from detecting multi-modal social cues, emotional states, moods, and other contextual information to the one or more processors 107. The context engine 122 can receive data from the various sensors. In one or more embodiments, the one or more processors 107 are configured to perform the operations of the context engine 122.

In one or more embodiments, the electronic device 100 includes a port querying/identification manager 117. Working with the other components, the port querying/identification manager 117 can cause the communication device 109 to query a content presentation companion device for a content presentation companion device port facilitating an electrical communication channel between the electronic device 100 and a content presentation companion device. Illustrating by example, in one or more embodiments the port querying/identification manager 117 can cause the communication device 109 to query the content presentation companion device for the content presentation companion device port facilitating a wired electrical communication channel between the electronic device 100 and the content presentation companion device using an HDMI protocol.

In one or more embodiments, the port querying/identification manager 117 can cause the communication device 109 to query the content presentation companion device for the content presentation companion device port facilitating the wired electrical communication channel with a hot plug detect feature of the HDMI protocol. The hot plug detect feature is used when the electronic device 100 is coupled to a content presentation companion device and both the electronic device 100 and the content presentation companion device are powered ON. When this is the case, the hot plug detect feature relies upon a single pin that is pulled high or low when the electronic device 100 is connected to the content presentation companion device. Using this hot plug detect feature, the content presentation companion device can determine to which content presentation companion device port the electronic device 100 is coupled.

In one or more embodiments, the port querying/identification manager 117 also receives, via the communication device 109, an identifying communication from the content presentation companion device indicating to which content presentation companion device port the electronic device 100 is coupled. As noted above, in one or more embodiments the port querying/identification manager 117 can received an EDID file having an extension comprising the identity of the content presentation companion device port or input source from the content presentation companion device in response to the port querying/identification manager 117 making the initial query.

In one or more embodiments, the port querying/identification manager 117 can cause a user interface of the electronic device 100, examples of which include the display 101 or the audio output devices included with the other components 121, to identify the content presentation companion device port to which the electronic device 100 is connected. Illustrating by example, in one or more embodiments the port querying/identification manager 117 can cause the one or more processors 107 to present a prompt on the display 101 of the electronic device 100 identifying the content presentation companion device port to which the electronic device 100 is connected.

In other embodiments, the port querying/identification manager 117 can identify the content presentation companion device port audibly. Using the loudspeakers of the other components 121, in one or more embodiments the port querying/identification manager 117 causes these loudspeakers to announce the identity of the content presentation companion device port audibly. Thus, in one or more embodiments the port querying/identification manager 117 causes the one or more processors 107 to cause an audio user interface to identify the content presentation companion device port by delivering an audible announcement comprising an identifier of the content presentation companion device port.

In one or more embodiments, the port querying/identification manager 117 only identifies the content presentation companion device port when the content presentation companion device is not tuned to that input source. In one or more embodiments, the one or more sensors 118 of the electronic device 100 determine whether the content presentation companion device is tuned to the input source corresponding to the content presentation companion device port.

The inclusion of the port querying/identification manager 117 allows the electronic device 100 to determine that it is connected to a content presentation companion device via a wire or other physical electrical communication connection. For instance, using the communication device 109, the port querying/identification manager 117 may determine that the USB-C port of the electronic device 100 is connected by a physical wire to an HDMI port of an external monitor.

In one or more embodiments, using the HDMI communication protocol, the port querying/identification manager 117 queries the content presentation companion device for the connected port information. Said differently, the port querying/identification manager 117 queries the content presentation companion device to find out to which input source port of the content presentation companion device the cable is connected. In one or more embodiments, the content presentation companion device utilizes the hot plug detection feature offered by connection protocols such as HDMI, DisplayPort™, or DVI port standards and protocols.

In one or more embodiments, the content presentation companion device then transmits, using a modified EDID communication, an EDID extension identifying the port to which the electronic device 100 is connected. Specifically, in one or more embodiments the content presentation companion device transmits an EDID file structure in which the EDID extension flag is set. In one or more embodiments, this extension flag indicates that an additional 128-byte block of data describing increased capabilities of the EDID standard in accordance with embodiments of the disclosure, known as an "extension," will be included with an identification of the port to which the electronic device is connected.

In one or more embodiments, when this EDID extension is received, the port querying/identification manager 117 reads the identity of the port or input source and causes the one or more processors 107 to present a prompt on the display 101 of the electronic device 100 that identifies the port or input source. This presentation of the port's or input source's identity on the display 101 allows the user to easily access and utilize this information to select the proper source on the content presentation companion device without having to look at the actual physical connection port to which the cable is physically connected.

Thus, as shown in FIG. 1, the electronic device 100 includes the communication device 109. The port querying/identification manager 117 can detect, using the communication device 109 establishment of an electrical communication channel to a content presentation companion device.

In one or more embodiments, the port querying/identification manager 117 causes the communication device 109 to query the content presentation companion device for a content presentation companion device port facilitating the electrical communication channel and, in response, causes the user interface to visually or audibly identify the content presentation companion device port. In one or more embodiments, this comprises presenting the identity of the content presentation companion device port on the display 101 of the electronic device 100.

In other embodiments, the identification of the content presentation companion device port can be audible rather than visual as a presentation on the display 101 of the electronic device 100. Illustrating by example, in one or more embodiments the port querying/identification manager 117 causes the one or more processors 107 to identify the content presentation companion device port by delivering an audible announcement comprising an identifier of the content presentation companion device port.

In some embodiments, the presentation of the identity of the input source or content presentation companion device port can be conditional and may only be presented only when the content presentation companion device is not tuned to the proper input source. In one or more embodiments, using the microphones 115, image capture device 116, and/or other sensors 118 of the electronic device 100, the port querying/identification manager 117 of the electronic device 100 can even determine whether the content presentation companion device is tuned to the source to which the electronic device 100 is connected. For instance, if the communication device 109 of the electronic device 100 is connected to a television using the second HDMI port, the microphones 115, image capture device 116, and/or other sensors 118 can determine if the input source to which the television is tuned is indeed HDMI2.

In one or more embodiments, the port querying/identification manager 117 can cause the content presentation companion device to present a test image and for the audio output devices of the content presentation companion device to emit a test sound. The image capture device 116 of the electronic device 100 can capture an image of the content presentation companion device to determine if the test image is being presented. Similarly, the microphones 115 of the electronic device 100 can capture acoustic signals emitted by the content presentation companion device to determine if the test sound is being played.

In situations where the input source of the content presentation companion device is not set or configured to the source with which the communication device 109 electronic device 100 is connected, the port querying/identification manager 117 can present a prompt on the display 101 identifying the content presentation companion device port to the user so that the user can tune to exactly the right input source. If, for example, the communication device 109 of the electronic device 100 is connected to HDMI2 of a content presentation companion device and the tuner of the content presentation companion device is tuned to an antenna, the port querying/identification manager 117 may present a prompt on the display 101 saying, "I'm connected to HDMI2—please tune the television to that input source." If the content presentation companion device is already tuned to HDMI2, in one or more embodiments the port querying/identification manager 117 of the electronic device 100 will omit the presentation of any prompt because the content presentation companion device is properly tuned and connected.

Accordingly, in one or more embodiments the electronic device comprises one or more sensors 118. The one or more sensors 118 can determine, using image processing by the image system analyzer 123, the audio input/processor 112, or combinations thereof, whether the content presentation companion device is tuned to the source corresponding to the content presentation companion device port to which the communication device 109 of the electronic device 100 is connected.

In one or more embodiments, when the one or more sensors 118 fail to detect that the content presentation companion device is tuned to the source corresponding to the content presentation companion device port to which the communication device 109 of the electronic device 100 is connected, the port querying/identification manager 117 presents a prompt on the display 101 indicating that the content presentation companion device is tuned to a communication channel other than the electrical communication channel coupling the electronic device 100 to the content presentation companion device. In one or more embodiments, the port querying/identification manager 117 can additionally present a prompt instructing the content presentation companion device be tuned to the electrical communication channel.

As with the context engine 122, the port querying/identification manager 117 can be operable with the one or more processors 107 in one or more embodiments. In some embodiments, the one or more processors 107 can control the port querying/identification manager 117. In other embodiments, the port querying/identification manager 117 can operate independently. The port querying/identification manager 117 can receive data from the various sensors 118. In one or more embodiments, the one or more processors 107 are configured to perform the port querying/identification manager 117.

Advantageously, embodiments of the disclosure determine the input port and/or source to which an electronic device 100 is connected to a content presentation companion device with a wire. In one or more embodiments, the electronic device 100 then presents on a display 101 (or via audio) an identification of the input port and/or source. One or more sensors 118 can even determine if the content presentation companion device is tuned to the input port and/or source.

A content presentation companion device integration manager 124 is operable to perform content redirection operations. In one or more embodiments, the content presentation companion device integration manager 124 allows the one or more processors 107 of the electronic device 100 to connect to a content presentation companion device such as a larger monitor, television, or other device having a larger screen. The content presentation companion device integration manager 124 then facilitates wireless streaming of content to the larger display of a content presentation companion device.

The inclusion of the content presentation companion device integration manager 124 allows the electronic device 100 to be used as a mouse, trackpad, or other control device while content is being presented on the content presentation companion device. The content presentation companion device integration manager 124 can be used for presenting pictures, videos, television shows, or movies on the larger display of a content presentation companion device. Additionally, the content presentation companion device integration manager 124 can facilitate gaming, video conferences, and other content presentation tasks using the display of a content presentation companion device as well.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices configured in accordance with embodiments of the disclosure may include various other components not shown in FIG. 1 or may include a combination of two or more components or a division of a particular component into two or more separate components, and still be within the scope of the present disclosure.

Figure 2:
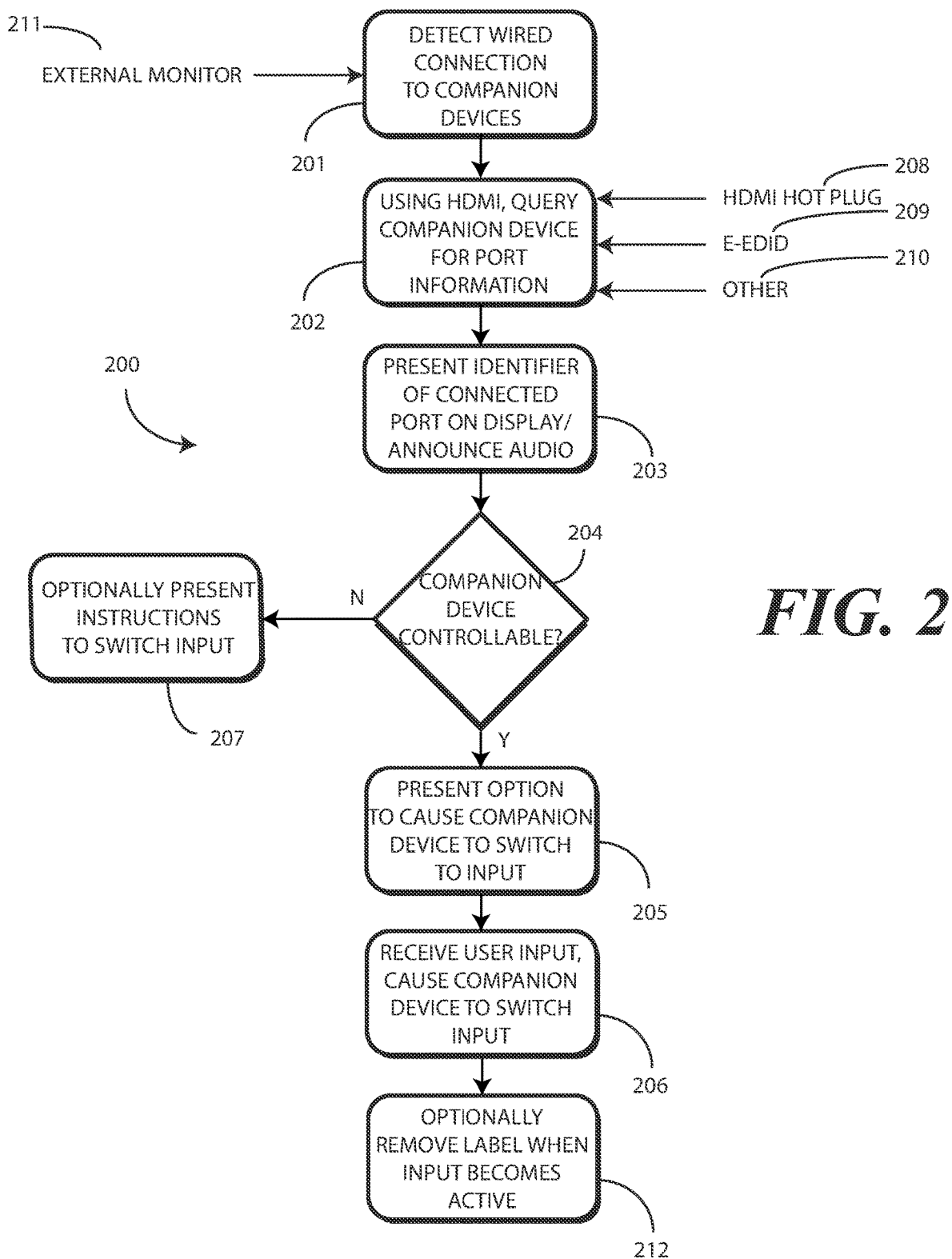
FIG. 2 illustrates one explanatory method in accordance with one or more embodiments of the disclosure.

Turning now to FIG. 2, illustrated therein is one explanatory method 200 suitable for use with and/or in an electronic device in accordance with one or more embodiments of the disclosure. Beginning at step 201, a communication device of the electronic device detects the establishment of an electrical communication channel to a content presentation companion device 211, one example of which is an external monitor. In one or more embodiments, the electrical communication channel between the content presentation companion device 211 and the electronic device comprises a wired electrical communication channel.

At step 202, a communication device of the electronic device queries the content presentation companion device 211 for a content presentation companion device port facilitating the electrical communication channel. Step 202 can be performed in a number of ways.

In one or more embodiments, an HDMI hot plug feature 208 is used to determine which content presentation companion device port facilitates the electrical communication channel between the electronic device and the content presentation companion device 211, as previously described. Said differently, in one or more embodiments step 202 comprises a communication device of the electronic device querying the content presentation companion device 211 for the content presentation companion device port facilitating the wired electrical communication channel using the HDMI protocol, requesting the content presentation companion device 211 identify the content presentation companion device port using the HDMI hot plug feature. However, other techniques 210 for determining which content presentation companion device port facilitates the electrical communication channel between the electronic device and the content presentation companion device 211 will be obvious to those of ordinary skill in the art having the benefit of this disclosure.

In one or more embodiments, the content presentation companion device 211 delivers the identity of the content presentation companion device port using a modified EDID communication 209. In one or more embodiments, this modified EDID communication 209 comprises the transmission of an EDID file structure and an EDID extension.

Turning briefly to FIG. 9, illustrated therein is an EDID file structure 900. The EDID file structure 900 is a standardized communication protocol that allows a display to inform a source as to the operating capabilities it possesses. Using the EDID file structure 900, a content presentation companion device can inform a source device regarding operating characteristics such as native resolution, display size, aspect ratio, color definition, and other supported features. The EDID file structure 900 can even identify the manufacturer and serial number of the content presentation companion device.

Communication of the EDID file structure 900 allows a source device to configure the content it delivers to the content presentation companion device without the user having to manually configure the same. Additionally, the EDID file structure 900 reduces the chance for the content being transmitted incorrectly from the source device to the content presentation companion device. Developed by the Video Electronic Standards Association (VESA), the EDID file structure 900 allows for far more information to be delivered from a content presentation companion device to a source device than, for example, having dedicated pins attempt to carry information using binary signals. In one or more embodiments.

The EDID file structure 900 defines a 128-byte data structure that includes manufacturer and operation-related data. As shown in FIG. 9, this information includes a vendor/product identification block, an EDID structure version and revision, basic display parameters and features, color characteristics, established timings, standard timing information, and detailed timing descriptions.

Relevant to embodiments of the disclosure, the EDID file structure 900 also allows for an extension flag 901. The extension flag 901, when set, indicates that an extension, which is an additional 128-byte block of data, will be included with the EDID file structure 900 to describe increased capabilities. Such an EDID extension is used in accordance with one or more embodiments of the disclosure.

Turning now to FIG. 10, illustrated therein is one explanatory EDID extension 1000 configured in accordance with one or more embodiments of the disclosure. As shown, the EDID extension 1000 includes a payload field 1001 comprising the identity of the content presentation companion device port or input source to which an electronic device is connected.

Turning now back to FIG. 2, in one or more embodiments step 202 comprises receiving the EDID file structure (900) and EDID extension (1000) having the payload field (1001) comprising the identity of the content presentation companion device port to which the electronic device is connected. While EDID information is typically exchanged when the electronic device is connected to the content presentation companion device 211, in one or more embodiments the modified EDID communication 209 comprising the EDID file structure (900) and EDID extension (1000) having the payload field (1001) comprising the identity of the content presentation companion device port to which the electronic device is connected is transmitted in response to a query from the electronic device. Accordingly, in one or more embodiments step 202 comprises one or more processors of the electronic device causing the communication device to query the content presentation companion device for the content presentation companion device port facilitating the wired electrical communication channel using a high-definition multimedia interface (HDMI) protocol.

The modified EDID communication 209 can provide the identity of the content presentation companion device port or input source because the standard's specifications define a five-volt supply connection to power the EDID circuitry in a content presentation companion device 211 so that communication is enabled even when the content presentation companion device 211 is powered OFF. Moreover, EDID supports hot plug detection such as that used by the HDMI standard. This not only allows EDID communication when a connection is made but allows the content presentation companion device 211 to determine to which content presentation companion device port or input source the electronic device is connected.

In one or more embodiments, when the modified EDID communication 209 is received, step 202 comprises one or more processors of the electronic device reading the identity of the port or input source. Step 203 then comprises the one or more processors of the electronic device causing the user interface of the electronic device to identify the content presentation companion device.

Step 203 can occur in a variety of ways. In one or more embodiments, the user interface comprises an audio user interface. In one or more embodiments, step 203 comprises the one or more processors causing the user interface to identify the content presentation companion device port by delivering an audible announcement comprising an identifier of the content presentation companion device port.

In other embodiments, the user interface comprises a display. In one or more embodiments, step 203 comprises the one or more processors causing the user interface to identify the content presentation companion device port by presenting a prompt comprising an identifier of the content presentation companion device port on the display.

Decision 204 then determines if the content presentation companion device 211 is controllable. Where it is, step 205 comprises presenting an option on the display of the electronic device asking a user if the user desires for the electronic device to cause the input selection of the content presentation companion device 211 to change to that corresponding to the content presentation companion device port. Where user input is received at step 206 requesting the same, step 212 can comprise causing the content presentation companion device 211 to switch its input to the one corresponding to the content presentation companion device port. Step 212 can also comprise removing any remaining prompts once this is complete. Otherwise, step 207 can comprise presenting instructions to the user as to how to adjust the tuning of the content presentation companion device 211 so that the content from the electronic device is presented on the content presentation companion device 211.

Figure 3:
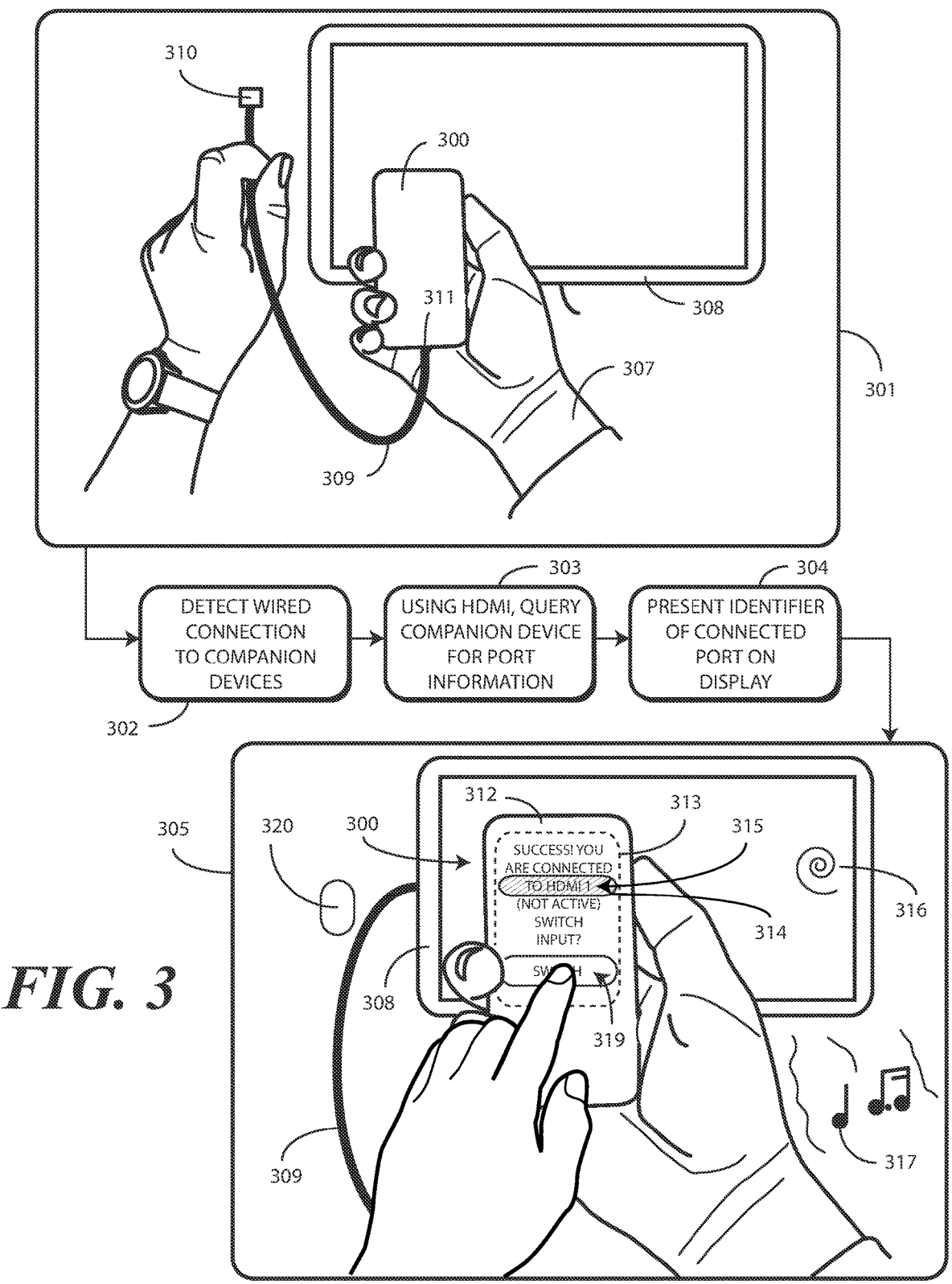
FIG. 3 illustrates one or more embodiments explanatory method steps in accordance with one or more embodiments of the disclosure.

To further illustrate how the method 200 of FIG. 2 functions, and turning now to FIG. 3, illustrated therein are one or more method steps showing various operations of the method (200) of FIG. 2. Beginning at step 301, a user 307 is holding an electronic device 300. In this explanatory example, the electronic device 300 includes a communication device and a user interface, much in the same way the electronic device (100) of FIG. 1 did above. The electronic device 300 also includes one or more processors operable with the communication device and user interface.

At step 301, the user 307 is holding a cable 309 connected to a port 311 of the electronic device 300 having a connector 310 at the end. In this illustrative embodiment, the connector 310 comprises an HDMI cable, and the user 307 desires to connect the connector 310 to a content presentation companion device port of a content presentation companion device 308. Examples of such content presentation companion device ports were illustrated and described above with reference to FIGS. 12-13.

At step 301, the user 307 reaches behind the content presentation companion device 308 and connects the connector 310 to an HDMI port of the content presentation companion device 308. Accordingly, step 301 establishes, with a communication device of the electronic device 300, an electrical communication channel with an input source of the content presentation companion device 308. In this illustration, the content presentation companion device 300 has a plurality of input sources, however. To wit, the content presentation companion device 308 has four different HDMI ports. Since the user 307 is not readily able to see behind the content presentation companion device 308 due to its proximity with a wall, the user 307 does not know to which HDMI port of the four the connector 310 is connected.

Advantageously, the method steps shown in FIG. 3 provide a solution to this problem. Specifically, at step 302 a communication device of the electronic device 300 detects establishment of an electrical communication channel, and in particular a wired electrical communication channel in this example, to the content presentation companion device 308. In one or more embodiments, this is done via hot plug detection.

The one or more processors of the electronic device 300 then begin the process of identifying the input source of the content presentation companion device 308 with which the electronic device 300 is electronically communicating using the cable 309 at step 303. Specifically, in one or more embodiments the one or more processors of the electronic device 300 cause the communication device to query the content presentation companion device 308 for the content presentation companion device facilitating the wired electrical communication channel at step 303. In one or more embodiments, the one or more processors of the electronic device 300 cause the communication device to query the content presentation companion device 308 for the content presentation companion device port at step 303 using the HDMI protocol.

At step 304, the one or more processors, in response to the querying operation occurring at step 303, cause the user interface to identify the content presentation companion device port or input source. As shown at step 305, in this example the user interface comprises a display 312. Accordingly, the one or more processors of the electronic device 300 cause the display 312 to present a prompt 313 comprising an identifier 314 of the content presentation companion device port 315 on the display 312. In this illustration, the prompt 313 states, "Success! You are connected to HDMI 1," which is the content presentation companion device port 315.

In this illustrative embodiment, the electronic device 300 also includes one or more sensors. At step 305, the one or more processors cause the one or more sensors to determine whether the content presentation companion device 308 is tuned to the input source corresponding to the wired electrical communication channel established by the cable 309.

Embodiments of the disclosure contemplate that the presentation of the prompt 313 shown at step 305 can be conditional and, in some embodiments, may only be presented only when the content presentation companion device 308 is not tuned to the proper input source corresponding to the wired electrical communication channel established by the connection of the cable 309 to the wired electrical communication channel. Accordingly, in one or more embodiments, the one or more processors of the electronic device 300 can use one or more microphones, cameras, and/or other sensors of the electronic device 30 to determine whether the content presentation companion device 308 is tuned to the input source to which the electronic device 300 is connected via the cable 309. For instance, if the electronic device 300 is indeed connected to the content presentation companion device 308 using the first HDMI port, as shown in this example. the microphone, camera, and/or other sensors can determine if the input source to which the content presentation companion device 308 is tuned is in fact HDMI 1.

This can occur in a variety of ways. In one or more embodiments, the one or more processors of the electronic device 300 can cause the content presentation companion device 308 to present a test image 316. The one or more processors can also cause audio output devices of the content presentation companion device 308 to emit a test sound 317.

Thereafter, the imager of the electronic device 300 can capture an image of the content presentation companion device 308 to determine if the test image 316 is being presented. Similarly, the microphone of the electronic device 300 can capture acoustic signals emitted by the content presentation companion device to determine if the test sound. 317 is being played. In situations where the input source of the content presentation companion device 308 device is not set or configured to the source with which the electronic device 300 is connected, the one or more processors can present a prompt 313 on the display 312 identifying the content presentation companion device port 315 to the user 307 so that the user 307 can tune to exactly the right input source.

Such is the case in FIG. 3. Specifically, the prompt 313 notes that HDMI 1 is "not active." Accordingly, in one or more embodiments step 305 comprises the one or more processors of the electronic device 300, in response to the one or more sensors failing to determine the content presentation companion device 308 is tuned to the wired electrical communication channel defined by the cable 309, further presenting a prompt 313 indicating the content presentation companion device 308 is tuned to a communication channel other than the wired electrical communication channel.

When this occurs, the electronic device 300 may, or may not, be capable of controlling the content presentation companion device 308. Where it is not, the prompt 313 may instruct the user 307 to tune the content presentation companion device 308 to the wired electrical communication channel. If, for example, the electronic device 300 is connected to HDMI 1 of the content presentation companion device 308 and the tuner of the content presentation companion device 308 is tunes to an antenna, the prompt 313 may say, "I'm connected to HDMI 1—please tune the television to that input source." If the content presentation companion device is already tuned to HDMI 1, in one or more embodiments the one or more processors of the electronic device 300 omit the presentation of the prompt 313 because the content presentation companion device 308 is properly tuned and connected.

However, in the example of FIG. 3 the electronic device 300 is capable of controlling the content presentation companion device 308. Accordingly, rather than providing instructions for manual tuning, the prompt 313 asks the user 307 if they would like to switch the input to HDMI 1. As shown at step 305, in response to the one or more processors failing to determine the content presentation companion device 308 is tunes to the wired electrical communication channel, the one or more processors receive user input 319 at the user interface and, in response to the user input 319, cause the communication device to transmit an instruction 320 to the content presentation companion device 308 over the wired electrical communication channel instructing the content presentation companion device 308 to tune to the input source corresponding to the wired electrical communication channel established by the cable 309.

Figure 4:
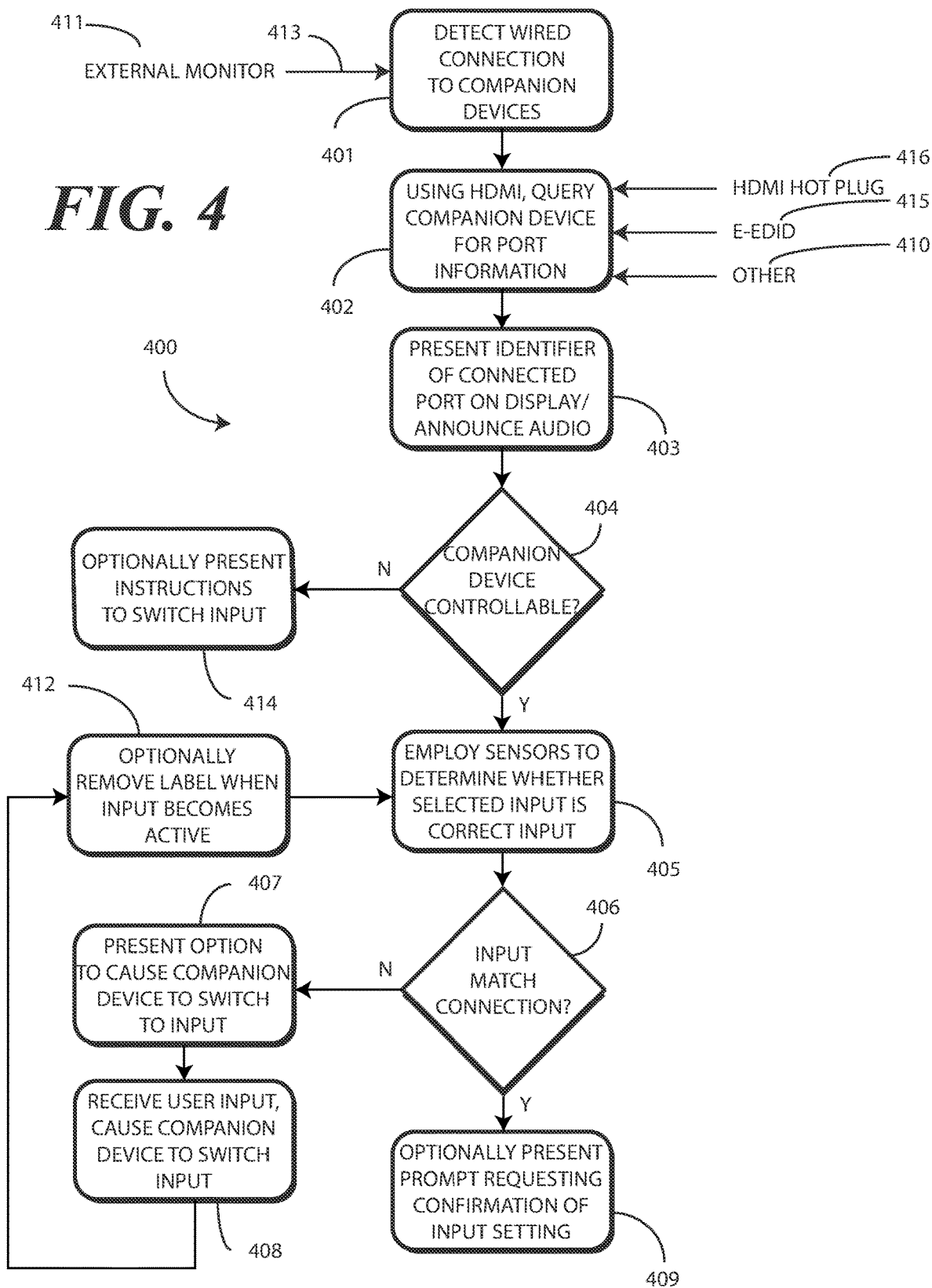
FIG. 4 illustrates another explanatory method in accordance with one or more embodiments of the disclosure.

Turning now to FIG. 4, illustrated therein is another method 400 in accordance with one or more embodiments of the disclosure. Beginning at step 401, an electrical communication channel is established with an input source 413 of a content presentation companion device 411 having a plurality of input sources. The electronic device to which the content presentation companion device 411 is connected can optionally detect this at step 401, as can the content presentation companion device, optionally using a hot plug detection feature 416 of the HDMI protocol or another similar protocol.

At step 402, the method 400 comprises querying, with a communication device of the electronic device in electrical communication channel with the content presentation companion device 411, the content presentation companion device 411 for an identification of the input source. In one or more embodiments, step 402 comprises one or more processors of the electronic device receiving an EDID file structure having an extension 415 comprising the identity of the input source, one example of which was described with reference to FIG. 10 above. Other techniques 410 for responding to the querying occurring at step 402 can be used as well, as will be obvious to those of ordinary skill in the art having the benefit of this disclosure.

At step 403, the method 400 includes presenting, by one or more processors of the electronic device in electrical communication channel with the content presentation companion device 411 on a user interface of the electronic device, an identification of the input source. Decision 404 then determines if the content presentation companion device 411 is controllable.

Where it is, step 405 comprises determining, with one or more sensors, whether the content presentation companion device 411 is tuned to the input source of the electrical communication channel. Whether the tuning is to the input source of the electrical communication channel is determined at decision 406. Where decision 406 determines tuning is to the input source, step 409 can optionally prompt for the user to confirm this fact.

In one or more embodiments, when the one or more sensors fail to determine the content presentation companion device 411 is tuned to the input source, step 407 can comprise presenting instructions on the user interface instructing the content presentation companion device to be tuned to the input source, which is similar to the instructional information presented at step 414. In this illustrative embodiment, however, since the content presentation companion device 411 is controllable, when the one or more sensors fail to determine the content presentation companion device 411 is tuned to the input source, step 407 comprises presenting a control icon causing, when actuated, the communication device of the electronic device to send an instruction instructing the content presentation companion device 411 to tune to the input source to the content presentation companion device.

At step 408, the user interface of the electronic device receives user input actuating the control icon. Accordingly, at step 408 the one or more processors of the electronic device cause the communication device of the electronic device to send an instruction instructing the content presentation companion device 411 to tune to the input source to the content presentation companion device. Step 412 then comprises removing the identification of the input source from the user interface when the one or more sensors determine the content presentation companion device 411 is tuned to the input source.

Figure 5:
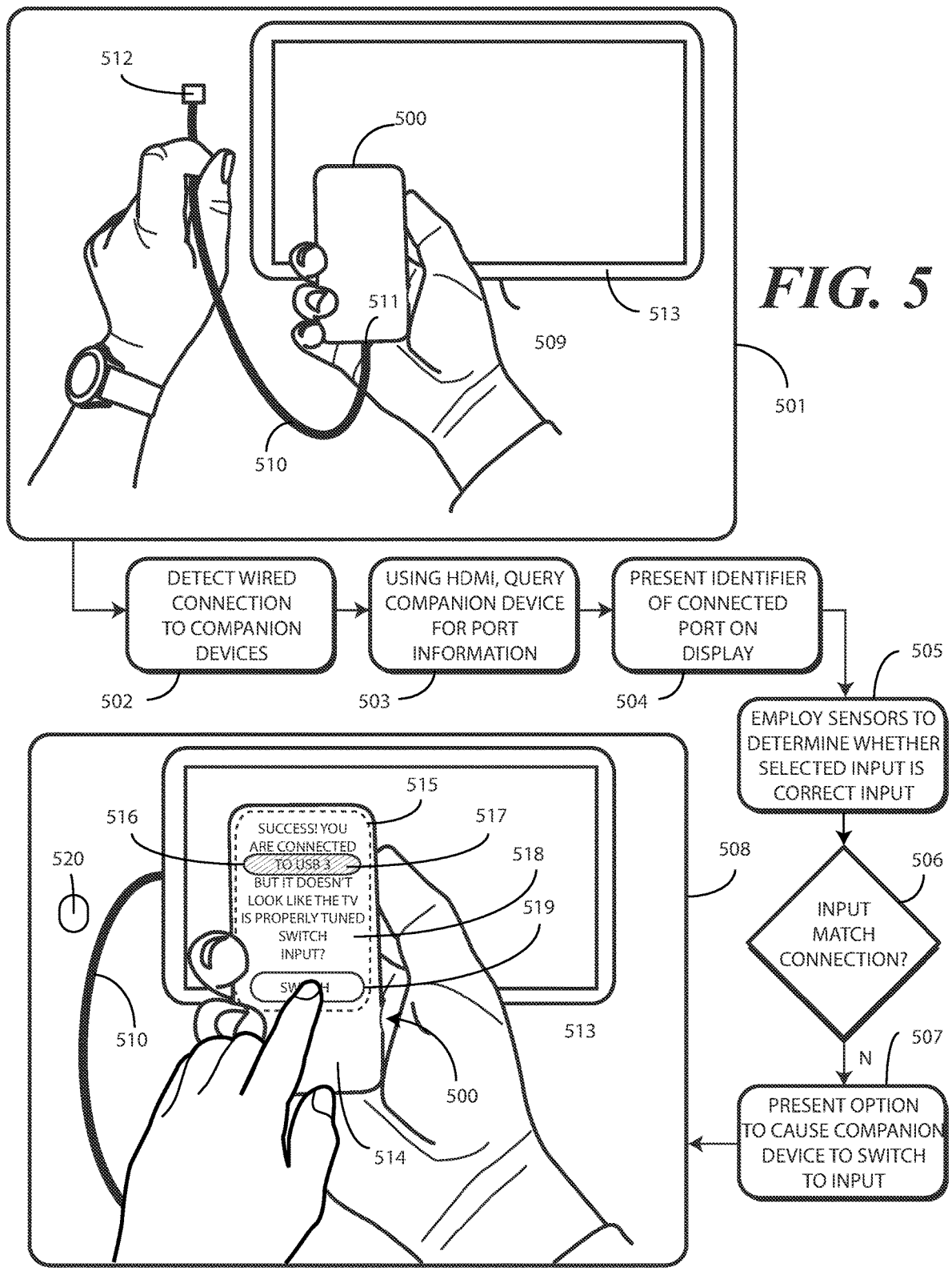
FIG. 5 illustrates one or more method steps in accordance with one or more embodiments of the disclosure.

To further illustrate how the method 400 of FIG. 4 functions, and turning now to FIG. 5, illustrated therein are one or more method steps showing various operations of the method (400) of FIG. 4. Beginning at step 501, a user 509 is holding an electronic device 500. In this explanatory example, the electronic device 500 includes a communication device and a user interface. The electronic device 500 also includes one or more processors operable with the communication device and user interface.

At step 501, the user 509 is holding a cable 510 connected to a port 511 of the electronic device 500 having a connector 512 at the end. In this illustrative embodiment, the connector 512 comprises an USB cable, and the user 509 desires to connect the connector 512 to a content presentation companion device port of a content presentation companion device 513.

At step 501, the user 509 reaches behind the content presentation companion device 513 and connects the connector 512 to a USB port of the content presentation companion device 513. Accordingly, step 501 establishes, with a communication device of the electronic device 500, an electrical communication channel with an input source of the content presentation companion device 513. In this illustration, the content presentation companion device 513 has a plurality of input sources, which include four different USB ports. Since the user 509 is not readily able to see behind the content presentation companion device 513, the user 509 does not know to which USB port of the four the connector 512 is connected.

Advantageously, the method steps shown in FIG. 5 provide a solution to this problem. Specifically, at steps 502,503 one or more processors of the electronic device 50 identify an input source of the content presentation companion device 513 with which the communication device of the electronic device 500 is electrically communicating in response to the communication device querying the content presentation companion device 513 to determine an identity of an input source with which the electronic device 500 is electronically communicating using the cable 510.

At step 502, a communication device of the electronic device 500 detects establishment of an electrical communication channel, and in particular a wired electrical communication channel in this example, to the content presentation companion device 513. In one or more embodiments, this is done via hot plug detection.

At step 503, one or more processors of the electronic device 500 query, with a communication device of the electronic device, to determine an identity of the input source with which the electronic device 500 is communicating. In one or more embodiments, the one or more processors of the electronic device 500 cause the communication device to query the content presentation companion device 513 for the content presentation companion device port at step 503 using the HDMI protocol.

At step 503, the one or more processors identify the input source of the content presentation companion device 513 with which the electronic device 500 is electronically communicating. In one or more embodiments, this step 503 comprises receiving an EDID file having an extension comprising the identity of the input source. Since the electronic device 500 is electrically communicating using the cable 510, in this illustrative embodiment, the communication device of the electronic device 500 is electrically communicating with the content presentation companion device 513 using a wired electrical communication channel, with the input source being identified by an input source port to which the connector 512 of the cable 510 is connected.

At step 504, the one or more processors, in response to the querying operation occurring at step 503, cause the user interface to identify the content presentation companion device port or input source. As shown at step 508, in this example the user interface comprises a display 514. Accordingly, the one or more processors of the electronic device 500 cause the display 514 to present a prompt 515 comprising an identifier 516 of the content presentation companion device port 517 on the display 514. In this illustration, the prompt 515 states, "Success! You are connected to USBI 3," which is the content presentation companion device port 517.

In this illustrative embodiment, the electronic device 500 also includes one or more sensors. At step 505, the one or more processors cause the one or more sensors to determine whether the content presentation companion device 513 is tuned to the input source corresponding to the wired electrical communication channel established by the cable 510. This can occur as previously described above with reference to FIG. 3.

Decision 506 then determines whether the tuned input and the content presentation companion device port 517 match. In the illustrative embodiment of FIG. 5, they do not. Accordingly, step 507 comprises the one or more processors of the electronic device 500, in response to the one or more sensors failing to determine the content presentation companion device 513 is tuned to the wired electrical communication channel defined by the cable 510, further presenting a prompt 518 indicating the content presentation companion device 513 is tuned to a communication channel other than the wired electrical communication channel.

When this occurs, since the electronic device 500 is capable of controlling the content presentation companion device 513, the prompt 515 tells the user 509 it does not appear as if the tuned input and the input source to which the cable 510 is connected match. As shown at step 508, in response to the one or more processors failing to determine the content presentation companion device 513 is tuned to the wired electrical communication channel, the one or more processors present a control icon 519 causing, when actuated, the communication device of the electronic device 500 to send an instruction 520 to the content presentation companion device 513 to tune the input source to correspond with the content presentation companion device port 517 to which the cable 510 is attached. Thereafter, the one or more processors can remove the identity of the content presentation companion device port 517 from the user interface when the one or more sensors determine the content presentation companion device 513 is tuned to the input source, as previously described.

Figure 6:
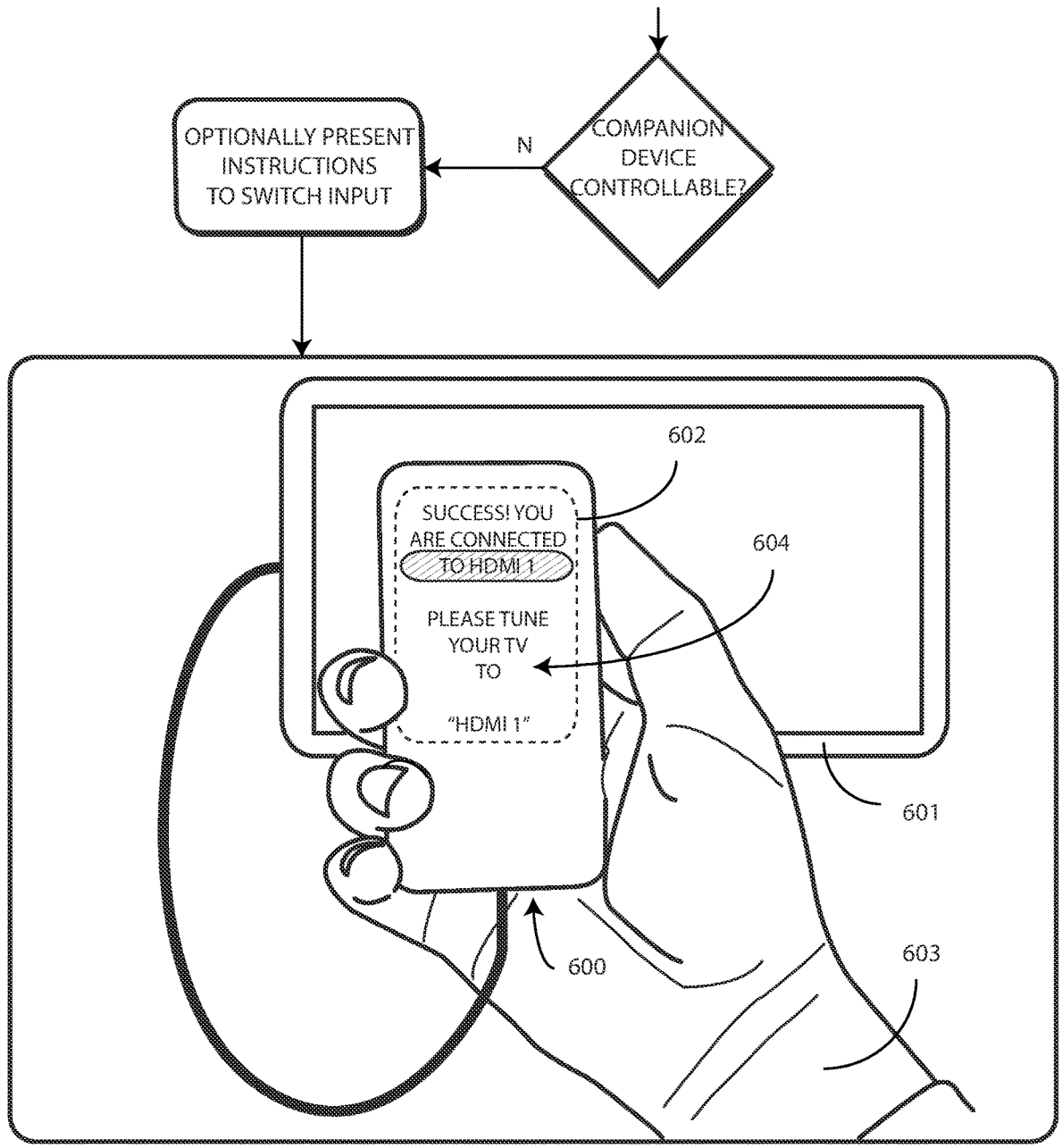
FIG. 6 illustrates one or more method steps in accordance with one or more embodiments of the disclosure.

As noted above, in other embodiments when the one or more sensors fail to determine the content presentation companion device 513 is tuned to the input source, the one or more processors of the electronic device 500 can present instructions on the user interface instructing the content presentation companion device to be tuned to the input source. Turning now to FIG. 6, illustrated therein is one example of such instructions.

In some embodiments, the electronic device 600 may, or may not, be capable of controlling the content presentation companion device 601. Where it is not, one or more processors of the electronic device 600 may present a prompt 602 that instructs the user 603 to tune the content presentation companion device 601 to the wired electrical communication channel. Such instructions 604, which state "Please tune your TV to HDMI 1" in this example, are included in the prompt 602. These instructions are illustrative only, as others will be obvious to those of ordinary skill in the art having the benefit of this disclosure.

Figure 7:
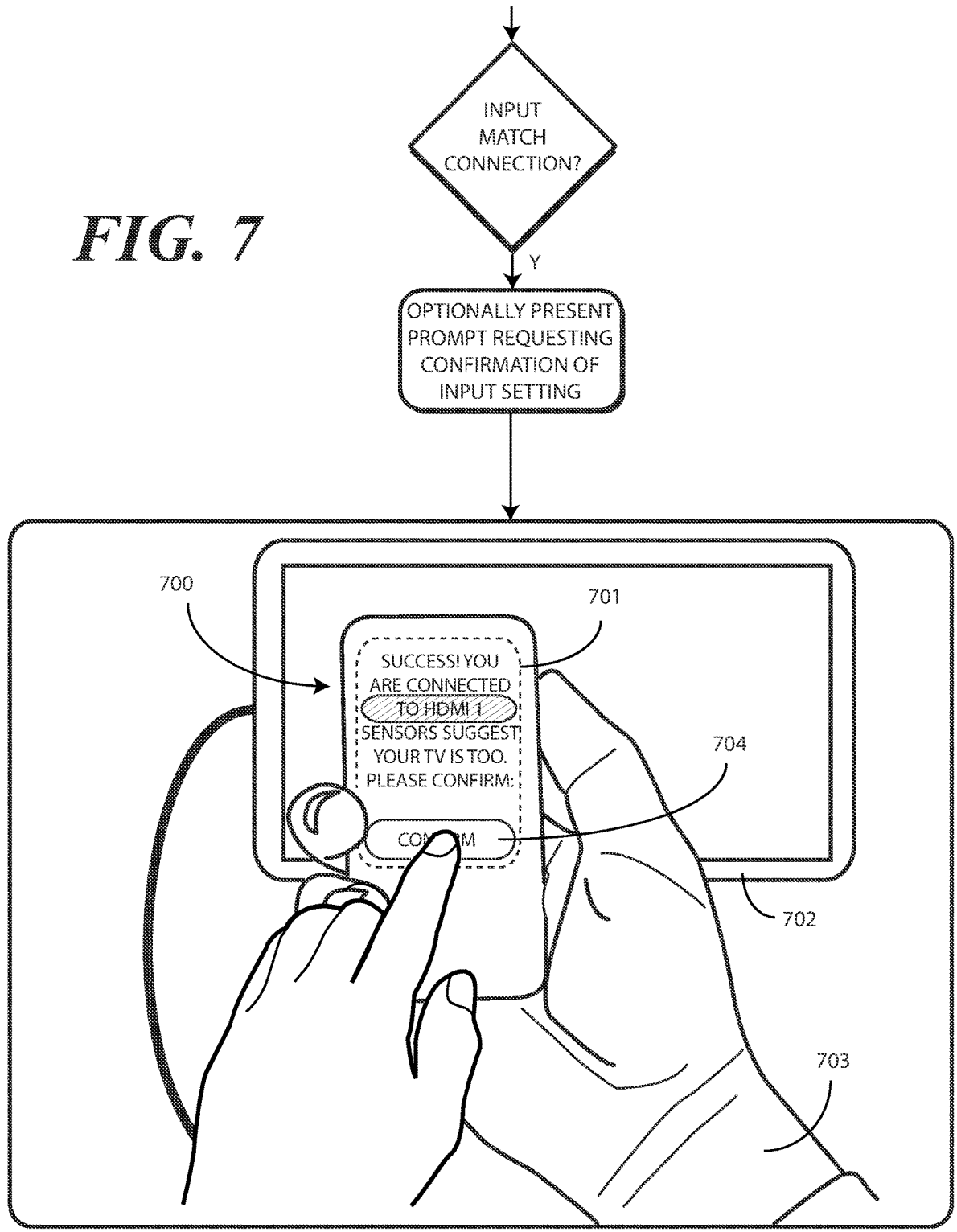
FIG. 7 illustrates one or more method steps in accordance with one or more embodiments of the disclosure.

Turning now to FIG. 7, illustrated therein is a confirmation prompt 701 in accordance with one or more embodiments of the disclosure. As also noted above, when it is determined that tuning of a content presentation companion device 702 is to the proper input source corresponding to a wired electrical communication channel between the content presentation companion device 702 and the electronic device 700, one or more processors of the electronic device 700 can present a confirmation prompt 701 asking a user 703 to confirm the same. In this illustration, the confirmation prompt 701 states, "Success! You are connected to HDMI 1. Sensors suggest your TV is too. Please confirm." The one or more processors of the electronic device 700 also present a control icon 704 that, when actuated, confirms that the tuning of the content presentation companion device 702 is correct. In one or more embodiments actuation of this control icon 704 causes the one or more sensors of the electronic device 700 to cease attempting to verify the same.

Figure 8:
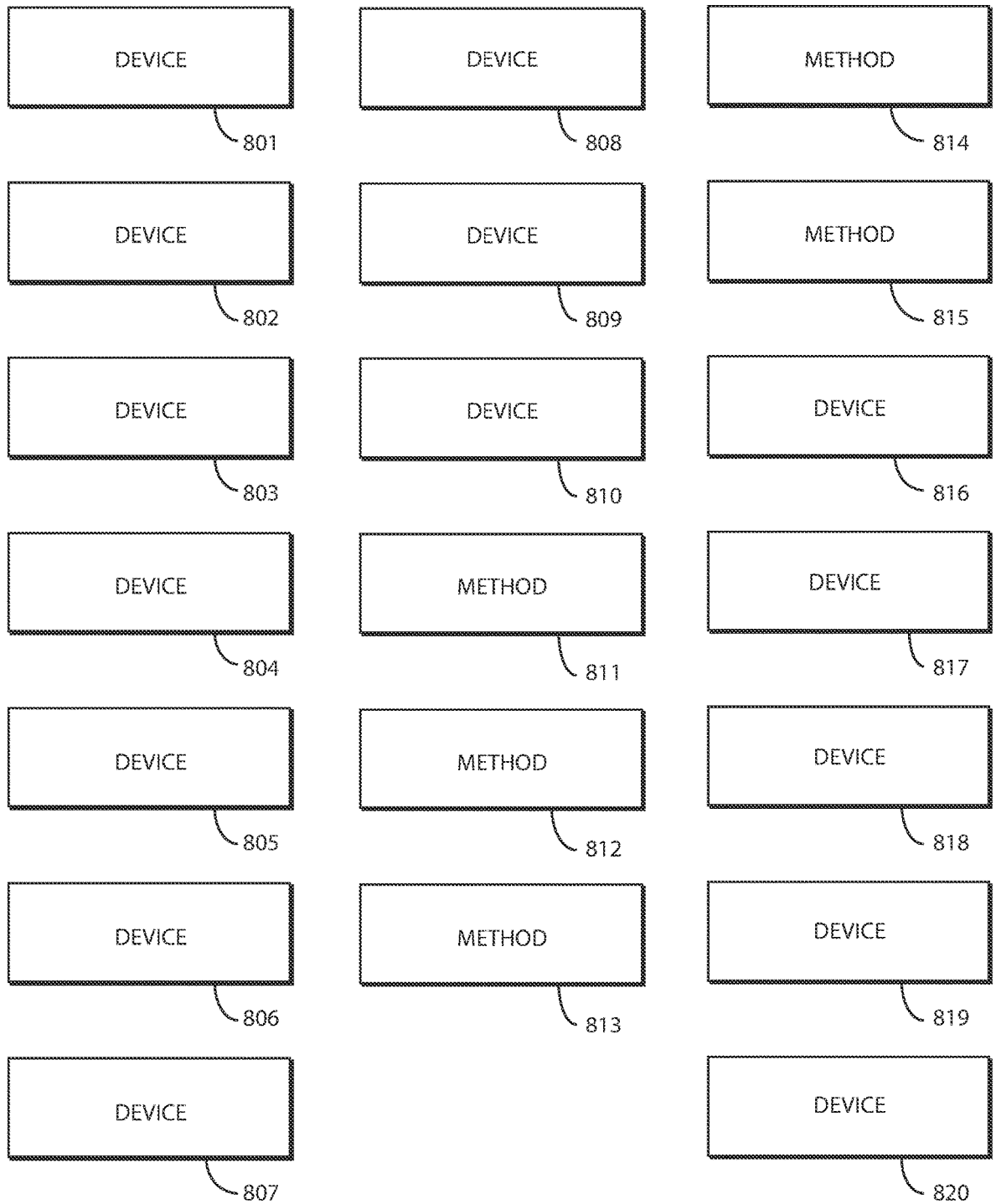
FIG. 8 illustrates one or more embodiments of the disclosure.

Turning now to FIG. 8, illustrated therein are various embodiments of the disclosure. The embodiments of FIG. 8 are shown as labeled boxes in FIG. 8 due to the fact that the individual components of these embodiments have been illustrated in detail in FIGS. 1-7, which precede FIG. 8. Accordingly, since these items have previously been illustrated and described, their repeated illustration is no longer essential for a proper understanding of these embodiments. Thus, the embodiments are shown as labeled boxes.

At 801, an electronic device comprises a communication device. At 801, the communication device detects establishment of an electrical communication channel to a content presentation companion device.

At 801, the electronic device comprises a user interface and one or more processors operable with the user interface and the communication device. At 801, the one or more processors cause the communication device to query the content presentation companion device for a content presentation companion device port facilitating the electrical communication channel. At 801, in response, the one or more processors cause the user interface to identify the content presentation companion device port.

At 802, the user interface of 801 comprises an audio user interface. At 802, the one or more processors cause the user interface to identify the content presentation companion device port by delivering an audible announcement comprising an identifier of the content presentation companion device port.

At 803, the user interface of 801 comprises a display. At 803, the one or more processors cause the user interface to identify the content presentation companion device port by presenting a prompt comprising an identifier of the content presentation companion device port on the display.

At 804, the electrical communication channel of 801 comprises a wired electrical communication channel. At 805, the one or more processors of 804 cause the communication device to query the content presentation companion device for the content presentation companion device port facilitating the wired electrical communication channel using a high-definition multimedia interface (HDMI) protocol. At 806, the one or more processors of 805 cause the communication device to query the content presentation companion device for the content presentation companion device port facilitating the wired electrical communication channel with a hot plug detect feature of the HDMI protocol.

At 807, the electronic device of 801 comprises one or more sensors. At 807, the one or more processors cause the one or more sensors to determine whether the content presentation companion device is tuned to the electrical communication channel.

At 808, the one or more processors of 807, in response to the one or more sensors failing to determine the content presentation companion device is tuned to the electrical communication channel, further present a prompt indicating the content presentation companion device is tuned to a communication channel other than the electrical communication channel. At 809, the one or more processors of 807, in response to the one or more sensors failing to determine the content presentation companion device is tuned to the electrical communication channel, further present a prompt instructing the content presentation companion device to be tuned to the electrical communication channel.

At 810, the one or more processors of 807, in response to the one or more sensors failing to determine the content presentation companion device is tuned to the electrical communication channel, receiving user input at the user interface. At 810, in response to the user input, causing the communication device to transmit an instruction to the content presentation companion device over the electrical communication channel instructing the content presentation companion device to tune to the electrical communication channel.

At 811, a method in an electronic device comprises establishing, with a communication device, an electrical communication channel with an input source of a content presentation companion device having a plurality of input sources. At 811, the method comprises querying, with the communication device, the content presentation companion device for an identification of the input source. At 811, the method comprises presenting, by one or more processors on a user interface, the identification of the input source.

At 812, the method of 811 further comprises determining, with one or more sensors, whether the content presentation companion device is tuned to the input source. At 813, the method of 812 further comprises, when the one or more sensors fail to determine the content presentation companion device is tuned to the input source, presenting instructions on the user interface instructing the content presentation companion device to be tuned to the input source.

At 814, the method of 812 further comprises, when the one or more sensors fail to determine the content presentation companion device is tuned to the input source, presenting a control icon causing, when actuated, the communication device to send an instruction instructing the content presentation companion device to tune to the input source to the electrical communication channel. At 815, the method of 812 further comprises removing the identification of the input source from the user interface when the one or more sensors determine the content presentation companion device is tuned to the input source.

At 816, an electronic device comprises a communication device, a user interface, and one or more processors operable with the communication device and the user interface. At 816, the one or more processors identify an input source of a content presentation companion device with which the communication device is electrically communicating on the user interface in response to the communication device querying the content presentation companion device to determine an identity of the input source with which it is electrically communicating.

At 817, the one or more processors of 816 identify the input source of the content presentation companion device on the user interface in response to communication device establishing electrical communications with the content presentation companion device. At 818, the one or more processors of 816 identify the input source of the content presentation companion device on the user interface in response to the communication device receiving extended display identification data (EDID) having an extension comprising the identity of the input source.

At 819, the communication device of 816 electrically communicating with the content presentation companion device uses a wired electrical communication channel. At 819, the input source is defined by an input source port. At 820, the electronic device of 816 further comprises one or more sensors. At 820, the one or more processors remove the identity of the input source from the user interface when the one or more sensors determine the content presentation companion device is tuned to the input source.

Figure 11:
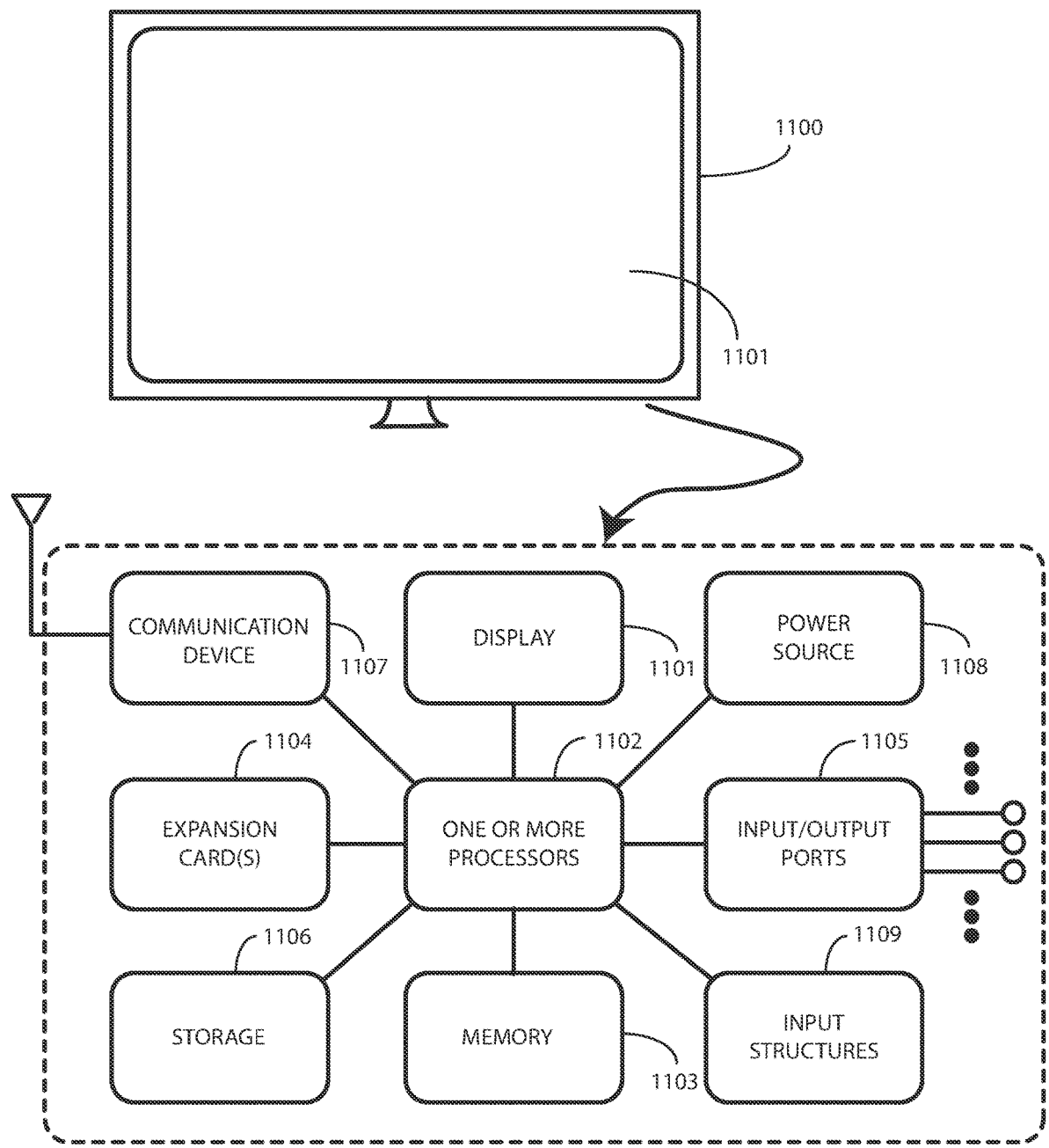
FIG. 11 illustrates a one explanatory content presentation companion device in accordance with one or more embodiments of the disclosure.

For completeness, and turning now to FIG. 11, illustrated therein is one explanatory content presentation companion device 1100 in accordance with one or more embodiments of the disclosure. In this illustrative embodiment, the content presentation companion device 1100 comprises a color video monitor.

In other embodiments, the content presentation companion device 1100 can take other forms. Illustrating by example, the content presentation companion device 1100 can be a television, a computer display, a laptop display, a tablet computer, or a projector projecting content onto a screen. Other examples of content presentation companion devices 1100 will be obvious to those of ordinary skill in the art having the benefit of this disclosure.

Regardless of configuration, in one or more embodiments the content presentation companion device 1100 includes one or more processors 1102, a display 1101, a memory 1103, an audio output that forms one of the various input/output ports 1105, and a communication device 1107 capable of wired or wireless communication with an electronic device such as the electronic device (100) of FIG. 1.

In one or more embodiments, when coupled by either a wireless or wired connection to such an electronic device (100), the content presentation companion device 1100 can function as a primary display for the electronic device (100). The electronic device (100) can receive content from a terrestrial broadcast network, cable television network, Internet streaming service, or combinations thereof, and redirect this content to the content presentation companion device 1100 since its display 1101 is larger than the display (101) of the electronic device (100). This allows people within the environment of the electronic device (100) or content presentation companion device 1100 to more easily see the content. In one or more embodiments, content flows from the electronic device (100) to the content presentation companion device 1100 through the communication device 1107.

In one or more embodiments, the communication device 1107 of the content presentation companion device 1100 is configured to detect wired electrical communication channels via a hot plug detection feature. Thereafter, in one or more embodiments the one or more processors 1102 can cause the communication device 1107 to transmit an EDID file structure (900) and corresponding EDID extension (1000) identifying the input source to which the wired electrical communication channel is connected, as previously described.

The content presentation companion device 1100 can also include input structures 1109, nonvolatile storage devices 1106 that store the EDID file structure (900), an expansion card 1104, and a power source 1108. The various functional blocks shown in FIG. 11 may include hardware elements (including circuitry), software elements (including computer code stored on a computer-readable medium) or a combination of both hardware and software elements. It should be noted that FIG. 11 is merely one example of a particular implementation and is intended to illustrate the types of components that may be present in the content presentation companion device 1100. Other circuitry structures for content presentation companion devices configured in accordance with embodiments of the disclosure will be obvious to those of ordinary skill in the art having the benefit of this disclosure.

The one or more processors 1102 and/or other data processing circuitry may be operably coupled with the memory 1103 and/or the nonvolatile storage 1106. The EDID file structure (900), the EDID extension (1000), programs or instructions executed by the one or more processors 1102, and/or other information can be stored in any suitable article of manufacture that includes one or more tangible, computer-readable media at least collectively storing the instructions or routines. Examples of these elements include the memory 1103 and the nonvolatile storage 1106, which can include random-access memory, read-only memory, rewritable flash memory, hard drives, and optical discs.

The input structures 1109 can enable a user to interact with the content presentation companion device 1100. The input/output ports 1105 can enable the content presentation companion device 1100 to interface with various other electronic devices. The expansion cards 1104 and/or the communication device 1107 can include, for example, content presentation companion device ports to which wired electrical communication channel can be made by coupling a wire or cable, interfaces for a personal area networks, such as a Bluetooth network, for a local area networks, such as an 802.11x Wi-Fi network, and/or for a wide area networks, such as a 3G or 4G cellular network. The power source 1108 of the content presentation companion device 1100 may be any suitable source of power, such as a rechargeable lithium polymer (Li-poly) battery and/or an alternating current (AC) power converter.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a communication device, the communication device detecting establishment of an electrical communication channel to a content presentation companion device;
   a user interface; and
   one or more processors operable with the communication device and the user interface:
   the one or more processors causing the communication device to query the content presentation companion device for a content presentation companion device port facilitating the electrical communication channel and, in response, causing the user interface to identify the content presentation companion device port;
   further comprising one or more sensors, the one or more processors causing the one or more sensors to determine whether the content presentation companion device is tuned to the electrical communication channel.

2. The electronic device of claim 1, the user interface comprising an audio user interface, the one or more processors causing the user interface to identify the content presentation companion device port by delivering an audible announcement comprising an identifier of the content presentation companion device port.

3. The electronic device of claim 1, the user interface comprising a display, the one or more processors causing the user interface to identify the content presentation companion device port by presenting a prompt comprising an identifier of the content presentation companion device port on the display.

4. The electronic device of claim 1, the electrical communication channel comprising a wired electrical communication channel.

5. The electronic device of claim 4, the one or more processors causing the communication device to query the content presentation companion device for the content presentation companion device port facilitating the wired electrical communication channel using a high-definition multimedia interface (HDMI) protocol.

6. The electronic device of claim 5, the one or more processors causing the communication device to query the content presentation companion device for the content presentation companion device port facilitating the wired electrical communication channel with a hot plug detect feature of the HDMI protocol.

7. The electronic device of claim 1, the one or more sensors determining whether the content presentation companion device is tuned to the electrical communication channel from image data, audio data, or combinations thereof.

8. The electronic device of claim 7, the one or more processors, in response to the one or more sensors failing to determine the content presentation companion device is tuned to the electrical communication channel, further presenting a prompt indicating the content presentation companion device is tuned to a communication channel other than the electrical communication channel.

9. The electronic device of claim 7, the one or more processors, in response to the one or more sensors failing to determine the content presentation companion device is tuned to the electrical communication channel, further presenting a prompt instructing the content presentation companion device to be tuned to the electrical communication channel.

10. The electronic device of claim 7, the one or more processors, in response to the one or more sensors failing to determine the content presentation companion device is tuned to the electrical communication channel, receiving user input at the user interface and, in response to the user input, causing the communication device to transmit an instruction to the content presentation companion device over the electrical communication channel instructing the content presentation companion device to tune to the electrical communication channel.

11. A method in an electronic device, the method comprising:
establishing, with a communication device, an electrical communication channel with an input source of a content presentation companion device having a plurality of input sources;
querying, with the communication device, the content presentation companion device for an identification of the input source; and
presenting, by one or more processors on a user interface, the identification of the input source;
further comprising determining, with one or more sensors, whether the content presentation companion device is tuned to the input source.

12. The method of claim 11, wherein the one or more sensors comprise one or both of an audio input and/or an image capture device.

13. The method of claim 11, further comprising, when the one or more sensors fail to determine the content presentation companion device is tuned to the input source, presenting instructions on the user interface instructing the content presentation companion device to be tuned to the input source.

14. The method of claim 11, further comprising, when the one or more sensors fail to determine the content presentation companion device is tuned to the input source, presenting a control icon causing, when actuated, the communication device to send an instruction instructing the content presentation companion device to tune to the input source to the electrical communication channel.

15. The method of claim 11, further comprising removing the identification of the input source from the user interface when the one or more sensors determine the content presentation companion device is tuned to the input source.

16. An electronic device, comprising:
a communication device;
a user interface; and
one or more processors operable with the communication device and the user interface;
the one or more processors identifying an input source of a content presentation companion device with which the communication device is electrically communicating on the user interface in response to the communication device querying the content presentation companion device to determine an identity of the input source with which it is electrically communicating;
further comprising one or more sensors, the one or more processors removing the identity of the input source from the user interface when the one or more sensors determine the content presentation companion device is tuned to the input source.

17. The electronic device of claim 16, the one or more processors identifying the input source of the content presentation companion device on the user interface in response to communication device establishing electrical communications with the content presentation companion device.

18. The electronic device of claim 16, the one or more processors identifying the input source of the content presentation companion device on the user interface in response to the communication device receiving extended display identification data (EDID) having an extension comprising the identity of the input source.

19. The electronic device of claim 16, the communication device electrically communicating with the content presentation companion device using a wired electrical communication channel, with the input source being defined by an input source port.

20. The electronic device of claim 16, wherein the one or more sensors determine the content presentation companion device is tuned to the input source using image processing.

* * * * *